United States Patent Office 3,301,825
Patented Jan. 31, 1967

3,301,825
POLYESTER POLYCARBONATE POLYMERS
Fritz Hostettler and Eugene F. Cox, Charleston, W. Va., assignors to Union Carbide Corporation, a corporation of New York
No Drawing. Filed Sept. 26, 1963, Ser. No. 311,675
14 Claims. (Cl. 260—77.5)

This invention relates to polymers of cyclic compounds. In one aspect, the invention relates to various processes for polymerizing an admixture containing a cyclic ester compound and a cyclic carbonate compound. In another aspect, the invention relates to the polymeric compositions resulting from the aforesaid processes. In a further aspect, the invention relates to the vulcanizates which are obtained by cross-linking the aforesaid polymeric compositions by methods employed, for example, in the natural and synthetic rubber arts.

The polymerization processes of this invention are admirably suited to the preparation of novel polymeric compositions, the properties and characteristics of which can be "tailor-made" to fit a wide variety of uses and applications. The properties of the novel polymers, as initially prepared, can be varied over a wide range depending, for example, upon the proportion and kind of monomeric reactants and catalyst systems employed. Thus, for example, those novel polymers which contain a predominant amount of a cyclic ester compound such as epsilon-caprolactone and a small amount of an ethylenically unsaturated cyclic carbonate compound such as 4 - ethyl - 4-allyloxymethyl-2,6-dioxacyclohexanone yield polymeric compositions containing a plurality of pendant ethylenic sites along the polymer chain which, upon cross-linking through these ethylenic sites, result in elastomeric vulcanizates possessing outstanding properties. The elastomeric properties can be decreased, however, by employing a proportionally larger amount of the ethylenically unsaturated cyclic carbonate thus giving a gum stock, which upon curing, tends to be a hard, tough, and semi-elastomeric material.

It is pointed out at this time that the generic terms "polymeric gum stock" or "polyethylenically unsaturated polymeric gum stocks," as used herein, refers to the products which results from the polymerization of an admixture which contains a cyclic ester monomer(s) and an ethylenically unsaturated cyclic carbonate monomer(s). The cross-linked or cured "polymeric gum stock" be it via procedures which involve radiation, a peroxide compound, double bond sites such as sulfur and sulfur-type cures, combination of these procedures, etc., will be referred to as "vulcanizates" including "elastomeric vulcanizates."

Accordingly, one or more of the following objects will be achieved by the practice of the invention.

It is an object of the invention to provide novel processes for polymerizing an admixture comprising a cyclic ester monomer and a cyclic carbonate monomer. A further object of the invention is to provide novel polymers, the properties and characteristics of which can be "tailor-made" to fit a wide variety of uses and fields of applications. It is another object of the invention to prepare novel solid reactive polymers, e.g., polyethylenically unsaturated polymeric gum stocks, which result from the aforesaid processes. A further object of the invention is to provide novel solid reactive polymers which contain a major molar proportion of at least one cyclic ester monomer, e.g., epsilon-caprolactone, and a minor molar proportion of at least one ethylenically unsaturated cyclic carbonate monomer chemically combined therein. A yet further object of the invention is directed to various methods for cross-linking the novel polymeric gum stocks which are prepared by the aforesaid novel processes. A still further object of the invention is to provide novel vulcanizates which are obtained by cross-linking the novel polyethylenically unsaturated polymeric gum stocks, said vulcanizates exhibiting the characteristics of excellent tensile properties, good tear strength, and/or outstanding crack resistance. These and other objects will become apparent to those skilled in the art in the light of the instant specification.

The novel polymeric gum stocks can be prepared by various novel processes which involve contacting at least one cyclic ester monomer with at least one cyclic carbonate compound in the presence of certain catalysts described hereinafter. The monomeric cyclic esters which are contemplated are best illustrated by the following formula:

(I)
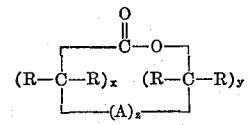

wherein each R, individually, can be hydrogen, alkyl, aryl, alkaryl, aralkyl, cycloalkyl, halo, haloalkyl, alkoxyalkyl, alkoxy, aryloxy, and the like; wherein A can be an oxy (—O—) group, a thio (—S—) group, a divalent saturated aliphatic hydrocarbon group, and the like; wherein $x$ is an integer from 1 to 15, inclusive; wherein $y$ is an integer from 1 to 15, inclusive; wherein $z$ is an integer having a value of zero or one; with the provisos that (a) the sum of $x+y+z$ cannot equal 3, (b) the total number of atoms forming the cyclic ester ring does not exceed 18, preferably does not exceed 9, (c) the total number of organic substituents (such as those described for the R variables) attached to the carbon atoms contained in the cyclic ester ring does not exceed 4, preferably does not exceed 3, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variables attached to any two adjacent carbon atoms contained in the cyclic ester ring can represent a portion of a fused aromatic hydrocarbon nucleus.

With reference to Formula I supra, illustrative R radicals include, among others, methyl, ethyl, n-propyl, isopropyl, n-butyl, sec-butyl, t-butyl, amyl, the hexyls, the heptyls, the octyls, dodecyl, octadecyl, phenyl, benzyl, tolyl, xylyl, ethylphenyl, phenethyl, phenylpropyl, phenylbutyl, cyclopentyl, 2-propylcyclohexyl, cyclohexyl, 2-methylcyclohexyl, cycloheptyl, chloromethyl, chloroethyl, bromopropyl, bromobutyl, chloro, fluoro, bromo, iodo, methoxymethyl, ethoxyethyl, propoxymethyl, butoxypropyl, methoxy, ethoxy, n-propoxy, n-butoxy, isopentoxy, n-hexoxy, 2-ethylhexoxy, 3-methyloctoxy, decoxy, dodecoxy, octadecoxy, phenoxy, ethylphenoxy, propylphenoxy, dimethylphenoxy, phenylpropoxy, and the like. It is preferred that each R, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

Representative monomeric cyclic esters which can be employed as starting materials in the methods of the invention include, for example, beta-propiolactone, delta-valerolactone, epsilon-caprolactone, 7-hydroxyheptanoic acid lactone, 8-hydroxyoctanoic acid lactone, 12-hydroxydodecanoic acid lactone, 13-hydroxytridecanoic acid lactone, 14-hydroxytetradecanoic acid lactone, 15-hydroxypentadecanoic acid lactone, 16-hydroxyhexadecanoic acid lactone, 17-hydroxyheptadecanoic acid lactone; the alpha,alpha-dialkyl-beta-propiolactones, e.g., alpha, alpha-dimethyl - beta - propiolactone, alpha,alpha-diethyl-beta-propiolactone, alpha,alpha - dipropyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-dialkyl-, or trialkyl-epsilon-caprolactones, e.g., the monomethyl-, monoethyl-, mono-isopropyl-, monohexyl-, mono-n-octyl-, dimethyl-, diethyl-, di-n-propyl-, diisobutyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, dimethoxy-, diethoxy-, and dibutoxy-delta-velarolactones and epsilon-caprolactones, and the like. Further illustrative cyclic esters include 3-ethyl-2-keto - 1,4 - dioxane, gamma(1-isopropyl-4-methylcyclohexyl)-epsilon-caprolactone, 3-bromo-2,3,4,5,-tetrahydrobenzoxepin - 2 - one, 2 - (2' - hydroxyphenyl)benzene carboxylic acid lactone, 10-hydroxy-undecanoic acid lactone, 2,5,6,7-tetrahydrobenzoxepin-2-one, 9 - oxabicyclo[5.2.2] undecan-8-one, 4-oxa-14-hydrotetradecanoic acid lactone, alpha,alpha - bis(chloromethyl) - propiolactone, 1,4-dioxane-2-one, 3-n-propyl-2-ketone-1,4-dioxane, 3-(2-ethylhexyl)-2-keto-1,4-dioxane, and the like. Illustrative subclasses of cyclic esters which are eminently suitable in the process of the instant invention include the unsubstituted lactones and the oxalactones which contain four and from six to eight atoms in the lactone ring, preferably delta-valerolactone, epsilon-caprolactone, the keto-dioxanes, and the like; the mono- and polyalkyl-substituted lactones and oxalactones which contain four and from six to eight atoms in the lactone ring, preferably the di(alpha-lower-alkyl)-beta-propiolactones and the mono- and poly-lower alkyl - delta - valerolactones, epsilon-caprolactones, and their corresponding oxalactones wherein the alkyl substituent(s) contains from 1 to 6 carbon atoms, and the like; and the mono- and polyalkoxy-substituted lactones and oxalactones which contain four and from six to eight atoms in the lactone ring, preferably the mono- and poly-lower alkoxy-delta-valerolactones, epsilon-caprolactones, and their corresponding oxalactones wherein the alkoxy substituent(s) contains from 1 to 6 carbon atoms.

The polymerization reactions will always involve at least one cyclic carbonate monomer which contains at least one ethylenic bond, $>C=C<$, and in addition thereto, the polymerizable admixture can also contain at least one cyclic carbonate monomer which is free of ethylenic and acetylenic unsaturation, as will be described at a later section. The ethylenically unsaturated cyclic carbonate monomers which are contemplated are those which contain at least 6 atoms, preferably 6 atoms, in the ring nucleus which possesses the carbonate group, i.e.,

and especially, those in which the ring nucleus is composed of carbon and oxygen, said oxygen being present in the form of the carbonate group,

The cyclic carbonate monomers are further characterized in that they contain no more than four substituents or groups bonded to the carbon atoms of the ring nucleus which contains the carbonate group. In a preferred aspect, the ethylenically unsaturated cyclic carbonate monomers are those (a) which possess the 1,3-dioxane-2-one nucleus, (b) which contain at least one organic substituent bonded to a carbon atom of the 1,3-dioxane-2-one nucleus, at least one substituent possessing at least one ethylenic bond, (c) which contain no more than 3 substituents bonded to the carbon atoms of the said nucleus, and (d) in which both ring carbon atoms which are alpha to the oxygen atoms of the carbonate group contain no more than one substituent on each of said carbon atoms. The cyclic carbonate monomers which are composed of (1) carbon, hydrogen, and oxygen atoms, or (2) carbon, hydrogen, oxygen, and nitrogen atoms, said nitrogen atom being in the form of nitro or tertiary amino groups, represent further preferred classes. In this respect, the oxygen is always present in the form of the carbonate group,

and etheric oxygen (—O—), esteric oxygen

and/or nitro oxygen (—NO$_2$) may also be present in the carbonate molecule.

Among the exemplary ethylenically unsaturated cyclic compounds are those depicted by the following formula:

(II)

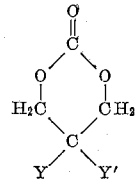

wherein Y can be hydrocarbyl, e.g., alkyl, cycloalkyl, aryl, alkaryl, aralkyl, alkenyl, cycloalkenyl, and the like; hydrocarbyloxymethyl, e.g., alkoxymethyl, alkenyloxymethyl, cycloalkoxymethyl, aryloxymethyl, cycloalkenyloxymethyl, aralkoxymethyl, and the like; acyloxymethyl, e.g., alkanoyloxymethyl, alkenoyloxymethyl, alkadienoyloxymethyl, alkatrienoyloxymethyl, arylcarbonyloxymethyl, and the like; nitro (—NO$_2$); and the unit

each R$_1$ being hydrocarbyl, that is, a monovalent hydrocarbon radical such as alkyl, alkenyl, cycloalkyl, aralkyl, cycloalkenyl, and the like; wherein Y' can be hydrocarbyl, e.g., alkyl, cycloalkyl, aryl, alkaryl, aralkyl, alkenyl, cycloalkenyl, and the like; hydrocarbyloxymethyl, e.g., alkoxymethyl, alkenyloxymethyl, cycloalkoxymethyl, aryloxymethyl, cycloalkenyloxymethyl, aralkoxymethyl, and the like; and acyloxymethyl, e.g., alkanoyloxymethyl, alkenoyloxymethyl, alkadienoyloxymethyl, alkartienoyloxymethyl, arylcarbonyloxymethyl, and the like; and wherein Y and Y' together with the gem carbon atom form a divalent ethylenically unsaturated carbocyclic or heterocyclic nuclei, e.g., (1)

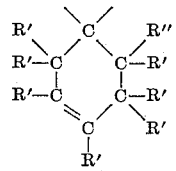

(2) 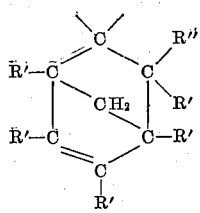

(3) 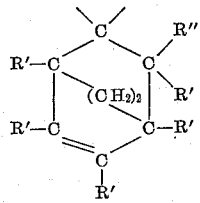

(4) 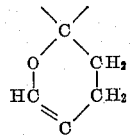

(5) 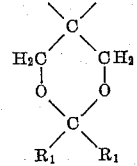

(6) 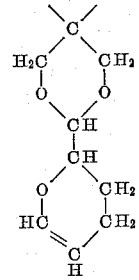

wherein $R_1$ of nuclei (5) above can be hydrogen or a monovalent hydrogen group, at least one of the two $R_1$ variables possessing ethylenic unsaturation, with the proviso that the choice of the Y and Y' is such that the monomeric cyclic carbonate of Formula II contains at least one carbon to carbon double bond. The R' radicals in the nuclei designated as (1) through (3) supra can be hydrogen or a monovalent hydrocarbon radical, preferably hydrogen or lower alkyl such as methyl, ethyl, isopropyl, n-propyl, isobutyl, n-butyl, sec-butyl, t-butyl, and the like. The R" radicals can be hydrogen; a monovalent hydrocarbon radical such as alkyl, aryl, cycloalkyl, alkaryl, aralkyl, alkenyl, etc., e.g., methyl, ethyl, n-propyl, isobutyl, 2-ethylhexyl, dodecyl, octadecyl, 3-butenyl, 6-octenyl, cyclopentyl, cyclohexyl, phenyl, tolyl, xylyl, phenethyl, benzyl, naphthyl, and the like; and furyl. It is preferred that R" be hydrogen, lower alkyl, or phenyl.

With reference to Formula II above, illustrative Y' radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the cycloalkyls, especially those which contain from 5 to 7 carbon atoms in the cycloaliphatic nucleus, e.g., cyclopentyl, cyclohexyl, cycloheptyl, alkylcyclopentyl, alkylcyclohexyl, alkylcycloheptyl, and the like; the aryl e.g., phenyl, naphthyl, anthryl, biphenylyl, and the like; the aralkyls, e.g., benzyl, phenethyl, phenylbutyl, and the like; the alkaryls, e.g., tolyl, xylyl, ethylphenyl, octylphenyl, and the like; the alkenyls, e.g., vinyl, allyl, crotyl, 3-butenyl, 2-methylpropenyl, 2-ethylhexenyl, and the like; the cycloalkenyls, especially those which contain from 5 to 6 carbon atoms in the cycloaliphatic nucleus, e.g., cyclopentenyl, cyclohexenyl, lower alkyl substituted cyclohexenyl, and the like; the alkoxymethyls, preferably the lower alkoxymethyls, e.g., methoxymethyl, ethoxymethyl, propoxymethyl, n-butoxymethyl, t-butoxymethyl, isobutoxymethyl, 2-ethylhexoxymethyl, decoxymethyl, and the like; the cycloalkoxymethyls, especially those which contain from 5 to 7 carbon atoms in the cycloaliphatic nucleus, e.g., cyclopentoxymethyl, cyclohexoxymethyl, cycloheptoxymethyl, lower alkyl substituted cyclohexoxymethyl, and the like; phenoxymethyl; benzyloxymethyl; naphthyloxymethyl; toloxymethyl; xyloxymethyl; ethylphenoxymethyl; and the like; the alkenyloxymethyls, e.g., vinyloxymethyl, allyloxymethyl, 3-butenyloxymethyl, 4-pentenyloxymethyl, 4-octenyloxymethyl, and the like; the cycloalkenyloxymethyls, especially those which contain from 5 to 6 carbon atoms in the cycloaliphatic nucleus, e.g., cyclopentenyloxymethyl, cyclohexenyloxymethyl, alkyl substituted cyclohexenyloxymethyl, and the like; the alkenylbenzyloxymethyls, e.g., vinylbenzyloxymethyl, allylbenzyloxymethyl, 4-pentenylbenzyloxymethyl, and the like; the acyloxymethyls, e.g., propenoyloxymethyl, 2-butenoyloxymethyl, 3-butenoyloxymethyl, 4-pentenoyloxymethyl, 4-octenoyloxymethyl, 3-phenyl-2-propenoyloxymethyl, ethanoyloxymethyl, propanoyloxymethyl, butanoyloxymethyl, hexanoyloxymethyl, octanoyloxymethyl, benzoyloxymethyl, cinnamoyloxymethyl, phenylethanoyloxymethyl, cyclohexanecarbonyloxymethyl, cyclohexenecarbonyloxymethyl, 2,4 - hexadienoyloxymethyl, linoleoyloxymethyl, oleoyloxymethyl, linolenoyloxymethyl, and the like.

With further reference to Formula II supra, illustrative Y radicals include (in addition to the aforementioned Y' radicals), the dialkylaminos, preferably the lower dialkylaminos, e.g., dimethylamino, diethylamino, diisopropylamino, di-n-butylamino, di-sec-butylamino, di-t-butylamino, diisobutylamino, di-2-ethylhexylamino, didodecylamino, dioctadecylamino, and the like; the dicycloalkylaminos, especially those which contain from 5 to 6 carbon atoms in the cycloaliphatic nucleus, e.g., dicyclopentylamino, dicyclohexylamino, di(lower alkyl-substituted cyclohexyl)-amino, and the like; diallylamino; dicrotylamino; and the like. It is pointed out at this time that the terms a "lower alkyl" radical or a "lower alkoxy" radical, as used herein, includes those radicals which contain from 1 to 6 carbon atoms therein. It is further preferred that the Y and Y' radicals, individually, contain no more than 12 carbon atoms each.

Exemplary classes of cyclic carbonate compounds include 4-nitro-4-alkenoyloxymethyl-2,6-dioxacyclohexanone,
4-dialkylamino-4-alkenoyloxymethyl-2,6-dioxacyclohexanone,
4-nitro-4-cycloalkenecarbonyloxymethyl-2,6-dioxacyclohexanone,
4-nitro-4-alkadienoyloxymethyl-2,6-dioxacyclohexanone,
4-nitro-4-alkatrienoyloxymethyl-2,6-dioxacyclohexanone,
4-nitro-4-alkenyloxymethyl-2,6-dioxacyclohexanone,
4-nitro-4-cycloalkenyloxymethyl-2,6-dioxacyclohexanone,
4-nitro-4-alkenylbenzyloxymethyl-2,6-dioxacyclohexanone,
4-dialkylamino-4-alkenyloxymethyl-2,6-dioxacyclohexanone,
4-dialkylamino-4-cycloalkenyloxymethyl-2,6-dioxacyclohexanone,
4-nitro-4-alkenyl-2,6-dioxacyclohexanone,
4-nitro-4-cycloalkenyl-2,6-dioxacyclohexanone,
4-alkyl-4-alkenyl-2,6-dioxacyclohexanone,
4-alkyl-4-cycloalkenyl-2,6-dioxacyclohexanone,
4-alkyl-4-alkenyloxymethyl-2,6-dioxacyclohexanone,
4-aryl-4-alkenyloxymethyl-2,6-dioxacyclohexanone, 4,4-dialkenyl-2,6-dioxacyclohexanone,
4,4-di(alkenyloxymethyl)-2,6-dioxacyclohexanone,
4,4-di(alkenoyloxymethyl)-2,6-dioxacyclohexanone,
4,4-dicycloalkenyl-2,6-dioxacyclohexanone, and the like.

Specific examples of the cyclic carbonate compounds include, for instance, 4-nitro-4-vinyloxymethyl-2,6-dioxacyclohexanone,
4-nitro-4-allyloxymethyl-2,6-dioxacyclohexanone,
4-nitro-4-(3-butenyloxymethyl)-2,6-dioxacyclohexanone,
4-nitro-4-(5-hexenyloxymethyl)-2,6-dioxacyclohexanone,
4-nitro-4-cyclohexenyloxymethyl-2,6-dioxacyclohexanone,
4-nitro-4-vinylbenzyloxymethyl-2,6-dioxacyclohexanone,
4-nitro-4-allylbenzyloxymethyl-2,6-dioxacyclohexanone,
4-dimethylamino-4-allyloxymethyl-2,6-dioxacyclohexanone,
4-diethylamino-4-allyloxymethyl-2,6-dioxacyclohexanone,
4-diisopropylamino-4-allyloxymethyl-2,6-dioxacyclohexanone,
4-dibutylamino-4-allyloxymethyl-2,6-dioxacyclohexanone,
4-nitro-4-allyl-2,6-dioxacyclohexanone,
4-nitro-4-crotyl-2,6-dioxacyclohexanone,
4-nitro-4-cinnamyl-2,6-dioxacyclohexanone,
4-nitro-4-(3-butenyl)-2,6-dioxacyclohexanone,
4-nitro-4-(2-octenyl)-2,6-dioxacyclohexanone,
4-nitro-4-cyclohexenyl-2,6-dioxacyclohexanone,
4-nitro-4-propenoyloxymethyl-2,6-dioxacyclohexanone,
4-nitro-4-(2-butenoyloxymethyl)-2,6-dioxacyclohexanone,
4-nitro-4-(3-butenoyloxymethyl)-2,6-dioxacyclohexanone,
4-nitro-4-(5-hexenoyloxymethyl)-2,6-dioxacyclohexanone,
4-nitro-4-cyclohexenecarbonyloxymethyl-2,6-dioxacyclohexanone,
4-dimethylamino-4-propenoyloxymethyl-2,6-dioxacyclohexanone,
4-diethylamino-4-propenoyloxymethyl-2,6-dioxacyclohexanone,
4-mehyl-4-vinyl-2,6-dioxacyclohexanone,
4-ethyl-4-allyl-2,6-dioxacyclohexanone,
4-ethyl-4-(3-butenyl)-2,6-dioxacyclohexanone,
4-isopropyl-4-allyl-2,6-dioxacyclohexanone,
4-ethyl-4-cyclohex-2-enyl-2,6-dioxacyclohexanone,
4-methyl-4-vinyloxymethyl-2,6-dioxacyclohexanone,
4-methyl-4-allyloxymethyl-2,6-dioxacyclohexanone,
4-ethyl-4-allyloxymethyl-2,6-dioxacyclohexanone,
4-ethyl-4-crotyloxymethyl-2,6-dioxacyclohexanone,
4-phenyl-4-allyloxymethyl-2,6-dioxacyclohexanone,
4,4-diallyl-2,6-dioxacyclohexanone,
4,4-dicrotyl-2,6-dioxacyclohexanone,
4,4-di(allyloxymethyl)-2,6-dioxacyclohexanone,
4,4-di(crotyloxymethyl)-2,6-dioxacyclohexanone,
4,4-di(propenoyloxymethyl)-2,6-dioxacyclohexanone,
4,4-di(allylbenzyloxymethyl)-2,6-dioxacyclohexanone, 2,7-dioxacyclohept-4-enone prepared by the high dilution technique using an inert organic vehicle and involving the reaction of 2-butene-1,4-diol with dialkyl carbonate as exemplified in Equation 3 supra.

The preparation of 4-nitro-4-hydrocarbyloxymethyl-2,6-dioxacyclohexanone or 4-nitro-4-acyloxymethyl-2,6-dioxacyclohexanone, etc., is effected by the following sequence of steps:

(1) 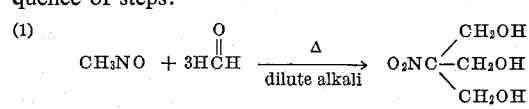

Equation 1 supra represents an aldol-like condensation reaction which can be conducted in the presence of a basic catalyst, e.g., a dilute alkali metal hydroxide solution, at a moderately elevated tmperature. The product, i.e., tris(hydroxymethyl)-nitromethane, is then contacted with a hydrocarbyl halide or an acyl halide which is designated as R″X in Equation 2 below:

(2) 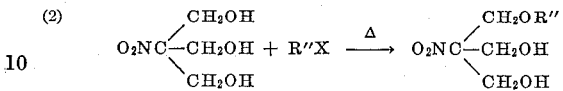

The resulting monoetherified product or monoesterified product, as may be the case, then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

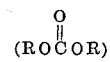
(ROCOR)

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals; the titanates having the general formulae $Y_2TiO_3$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3) 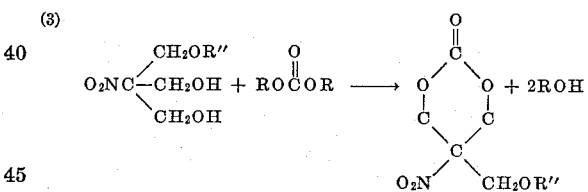

The R″ radical in Equation 3 above is hydrocarbyl or acyl.

The preparation of 4-tertiary amino-4-hydrocarbyloxymethyl-2,6-dioxacyclohexanone or 4-tertiary amino-4-acyloxymethyl-2,6-dioxacyclohexanone can be accomplished by contacting the monoetherified product or monoesterified product of Equation 2 supra with hydrogen, in the presence of convenitonal hydrogenation catalysts, e.g., Raney nickel, platinum, and the like, at an elevated temperature, followed by alkylation of the resulting primary amine group (—NH₂) with, for example a stoichiometric quality of a hydrocarbyl halide, preferably in the presence of a base, e.g., an alkali metal hydroxide, to thus convert said —NO₂ group to a tertiary amine group i.e., (4) 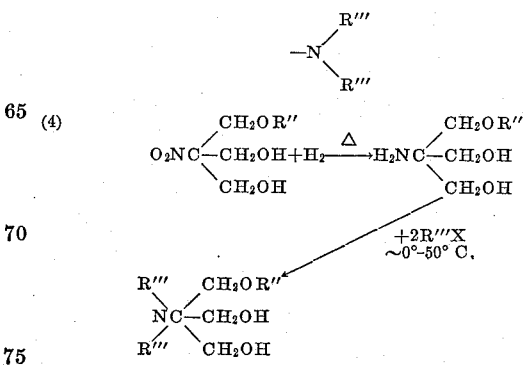

The resulting tertiary amino compounds are readily cyclized to the corresponding carbonates by following the procedure shown in Equation 3 supra.

The 4-nitro - 4 - hydrocarbyl-2,6-dioxacyclohexanones and 4-t-amino-4-hydrocarbyl - 2,6 - dioxacyclohexanones, can be prepared by the reaction of a hydrocarbyl substituted nitromethane, i.e., $RCH_2NO_2$ wherein R is an alkyl, aryl, cycloalkyl, aralkyl, alkaryl, alkenyl, cycloalkenyl, etc., with an excess of formaldehyde, as shown in the following equation:

(5)
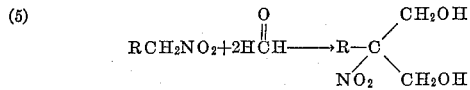

The resulting 2-nitro-2-hydrocarbyl-1,3-propanediol compound in Equation 5 then can be subjected to the cyclization step illustrated in Equation 3 supra, or it can undergo the sequence of steps illustrated in Equation 4, thus producing the corresponding various nitro and tertiary amino substituted carbonates.

The preparation of 4,4-di(hydrocarbyl)-2,6-dioxacyclohexanone is accomplished by an aldol condensation of the appropriate aldehyde which contains one alpha hydrogen atom, with formaldehyde, followed by a Cannizzaro reaction with additional formaldehyde. Equation 6 depicts the over-all reaction:

(6)
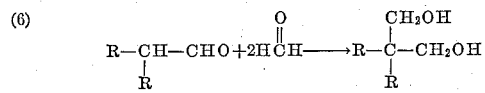

Both R's in Equation 6 represent hydrocarbyl groups. The resulting 2,2-di(hydrocarbyl)1,3-propanediol then can be subjected to the cyclization step discussed in Equation 3 to yield 4,4-di(hydrocarbyl)-2,6-dioxacyclohexanone.

The preparation of 4-hydrocarbyl-4-hydrocarbyloxymethyl-2,6-dioxacyclohexanone or 4-hydrocarbyl-4-acyloxymethyl-2,6-dioxacyclohexanone is conveniently prepared by employing an aldehyde which contains two alpha hydrogen atoms in Equation 6 supra, that is:

(7)
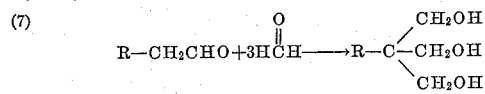

The resulting 1-hydrocarbyl - 1,1,1 - trimethylolmethane then can be reacted with R"X of Equation 2 supra, followed by the cyclization step of Equation 3 to obtain the cyclic carbonate under consideration.

The 4,4-di(hydrocarbyloxymethyl) - 2,6 - dioxacyclohexanones or 4,4-di(acyloxymethyl)-2,6-dioxacyclohexanones are prepared by the reaction of pentaerythritol with sufficient R"X (note Equation 2) to produce the diether or diester of pentaerythritol which, in turn, can be cyclized (note Equation 3) to yield the corresponding carbonates. Equation 8 below illustrates the over-all reactions.

(8)
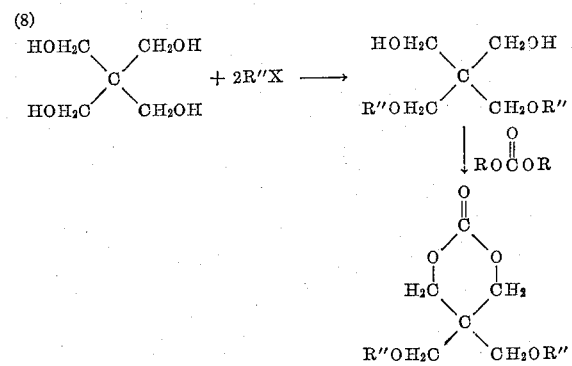

The spiro carbonates, i.e., those carbonates of Formula II supra wherein Y and Y' together with the gem carbon atom form the nuclei designated as (1) through (3) inclusive, can be effected by the following sequence of steps.

Firstly, the Diels-Alder reaction of equimolar quantities of a butadiene compound and an acrolein compound results in a cyclohexenecarboxaldehyde as shown below:

(9)
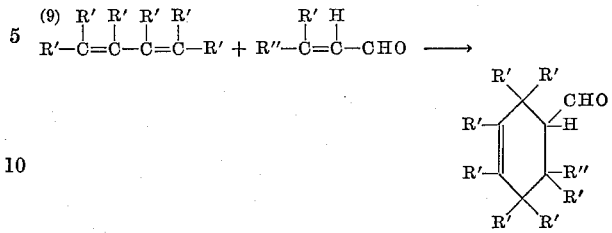

An aldol condensation of the resulting cyclohexenecarboxaldehyde product with formaldehyde, followed by a Cannizzaro reaction with additional formaldehyde, produces a 4,4-dimethylolcyclohexene product. Equation 10 below depicts the over-all reaction:

(10)
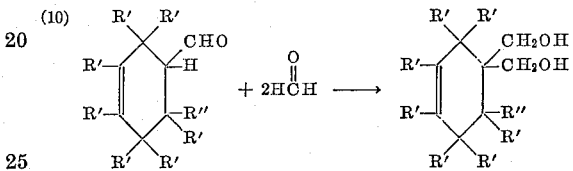

The resulting 4,4-dimethylolcyclohexene product can be cyclized to the corresponding carbonates by following the procedure shown in Equation 3 above.

The Diels-Alder reaction of equimolar quantities of a conjugated cycloalkadienic compound (having 5 or 6 ring carbon atoms) and an acrolein compound yields a carboxaldehyde substituted bicycloalkene product which, in turn, can be reacted with formaldehyde (note Equation 10 supra) to give a gem dimethylol substituted bicycloalkene. The cyclization step shown in Equation 3 above readily produces the spiro carbonates.

(11)
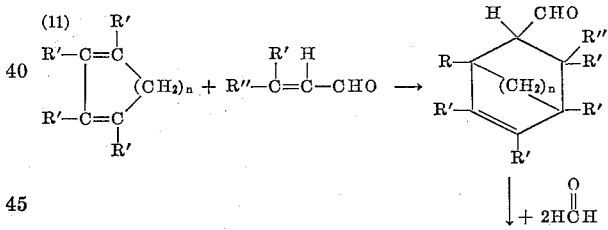

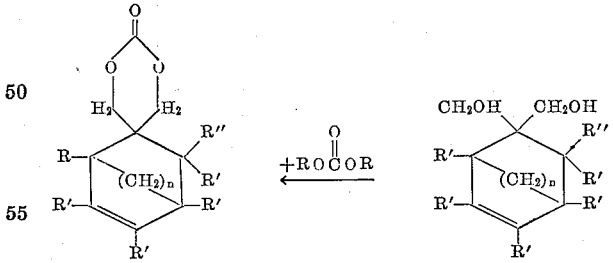

The variable $n$ in the above formulae is an integer which has a value of 1 or 2.

The 3 - oxo - 2,4,7 - trioxaspiro[5.5]undec - 8 - ene compound can be prepared by reacting acrolein dimer with formaldehyde (note Equation 11), followed by cyclizing the resulting 4,4 - dimethylol - 3 - oxacyclohexene product to produce the unsaturated carbonate under consideration; note Formula II, nuclei (4).

The ethylenically unsaturated 3 - oxo - 2,4,8,10 - tetraoxaspiro[5.5]undecanes are prepared by reacting an ethylenically unsaturated monocarbonyl compound, e.g., the alkenals such as acrolein, crotonaldehyde, methacrolein, decenal, etc.; the dialkenyl ketones, e.g., diallyl ketone, di-2-butenyl ketone, etc.; the alkenyl alkyl ketones; the alkenyl aryl ketones; and others; with pentaerythritol; in the presence of a mineral acid or hydrocarbon sulfonic acid catalyst, e.g., sulfuric acid, benzenesulfonic acid, and the like; at an elevated temperature, e.g., from about 50° C. to about 150° C.; followed by cyclizing the resulting 5,5 - dimethylol - 1,3 - dioxacyclohexane product as described in Equation 3 previously. Equation 12 below sets out the sequence of steps that are involved:

(12)

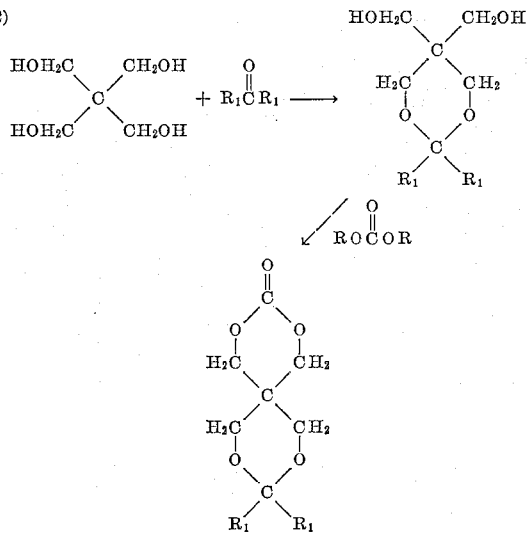

The $R_1$ variables of

can be hydrogen or a monovalent hydrocarbon group, at least one of the two $R_1$ variables possessing ethylenic unsaturation.

The preparation of 3 - oxo - 2,4,8,10 - tetraoxaspiro-[5.5]undecane - 9 - [2' - (2',3' - dihydropyran)]; note Formula II, nuclei (6) supra, is effected as indicated in Equation 12 except that

represents the acrolein dimer.

In a preferred embodiment, novel polymeric gum stocks are prepared by polymerizing an admixture which contains at least one cyclic ester monomer as illustrated previously, at least one cyclic carbonate monomer which contains ethylenic unsaturation, and at least one cyclic carbonate monomer which is free from ethylenic and acetylenic unsaturation (hereinafter termed "saturated" cyclic carbonate for brevity.) By virtue of the inclusion of the saturated cyclic carbonate in the polymerization medium, there can be obtained novel polymeric gum stocks which are "tailor-made" to fit a wide variety of uses. For example, the polymerization of about 95 mol percent of epsilon-caprolactone with about 5 mol percent of 4 - ethyl - 4 - allyloxymethyl - 2,6-dioxacyclohexanone (using, for example, n-butyllithium as the catalyst) results in relatively high molecular weight polymeric gum stocks which exhibit a relatively high degree of crystallinity. This crystallinity content, however, can be decreased by incorporating into the polymerization medium a saturated cyclic carbonate monomer such as, for example, 4,4-dimethyl-2,6-dioxacyclohexanone. Thus, a polymeric gum stock comprised of 70 mol percent epsilon-caprolactone, 25 mol percent 4,4-dimethyl-2,6-dioxycyclohexanone, and 5 mol percent 4-ethyl-4-allyloxymethyl-2,6-dioxycyclohexanone exhibits a greatly decreased crystallinity content than the aforesaid two component polymeric gum stock.

Among such saturated cyclic carbonate monomers which are contemplated in this preferred embodiment are those which contain at least 6 atoms (and upwards to 21 atoms), preferably 6 atoms, in the ring nucleus which possesses the carbonate group, i.e.,

and especially, those in which the ring nucleus is composed of carbon and oxygen, said oxygen being present in the form of the carbonate

Etheric oxygen can also be present in said nucleus. The saturated cyclic carbonate monomers are further characterized in that they contain no more than four substituents or groups bonded to the carbon atoms of the ring nucleus which contains the carbonate group. In a preferred aspect, these cyclic carbonate monomers are characterized in that (a) they possess the 1,3-dioxane-2-one nucleus, (b) they contain no more than 3 substituents bonded to the carbon atoms of said nucleus, and (c) both ring carbon atoms which are alpha to the oxygen atoms of the carbonate group contain no more than one substituent on each of said carbon atoms. The cyclic carbonate monomers which are composed of (1) carbon, hydrogen, and oxygen atoms, or (2) carbon, hydrogen, oxygen, and nitrogen atoms, said nitrogen atom being in the form of nitro, tertiary amino, cyanoalkyl, or cyanoalkoxymethyl represent further preferred classes. In this respect, the oxygen is always present in the form of the carbonate group,

and etheric oxygen (—O—) and/or esteric oxygen

and/or nitro oxygen may also be present in the carbonate molecule.

Illustrative of the cyclic carbonate monomers which lack ethylenic and acetylenic unsaturation are those which fall within the scope of Formula II supra sans the proviso, that is, the variables Y and Y' do not contain ethylenic or acetylenic unsaturation. Among the cyclic carbonates contemplated in this preferred embodiment include, by way of illustrations, the mono-, di-, and/or trihydrocarbyl substituted 2,6-dioxacyclohexanones such as the 3- and/or 4- and/or 5- alkyl-2,6-dioxacyclohexanones, the 3- and/or 4- and/or 5- aryl-2,6-dioxacyclohexanones, the 3- and/or 4- and/or 5- cycloalkyl-2,6-dioxacyclohexanones, the 3- and/or 4- and/or 5- alkaryl-2,6-dioxacyclohexanones, the 3- and/or 4- and/or 5- aralkyl-2,6-dioxacyclohexanone, e.g., 4,4-dimethyl-2,6-dioxacyclohexanone, 4,4,-diethyl-2,6-dioxacyclohexanone, 4,4-di-n-propyl-2,6-dioxacyclohexanone, 4,4-diisopropyl-2,6-dioxacyclohexanone, 4,4-diisobutyl-2,6-dioxacyclohexanone, 4,4-di-n-butyl-2,6-dioxacyclohexanone, 4,4-di-t-butyl-2,6-dioxacyclohexanone, 4,4-diphenyl-2,6-dioxacyclohexanone, 4,4-dicyclohexyl-2,6-dioxacyclohexanone, 3- and/or 4-methyl-2,6-dioxacyclohexanone, 3- and/or 4-ethyl-2,6-dioxacyclohexanone, 3- and/or 4-propyl-2,6-dioxacyclohexanone, 3- and/or 4-isopropyl-2,6-dioxacyclohexanone, 3- and/or 4-n-butyl-2,6-dioxacyclohexanone, 3- and/or 4-isobutyl-2,6-dioxacyclohexanone, 3- and/or 4-t-butyl-2,6-dioxacyclohexanone, 3- and/or 4-phenyl-2,6-dioxacyclohexanone, 3- and/or 4-tolyl-2,6-dioxacyclohexanone, 3- and/or 4-benzyl-2,6-dioxacyclohexanone, and the like; the 3,4,5-tri (lower alkyl)-2,6-dioxacyclohexanones, e.g., 3,4,5-trimethyl-2,6-dioxacyclohexanone, 3,4,5-triethyl-2,6-dioxacyclohexanone, and the like; the polymethylene carbonates which have at least 6 atoms in the ring nucleus which contains the carbonate group, e.g., trimethylene carbonate, decamethylene carbonate, undecamethylene carbonate, dodecamethylene carbonate, tridecamethylene carbonate, octadecamethylene carbonate, and the like; the polyoxyalkylene carbonates, e.g., triethylene glycol carbonate, tetraethylene glycol carbonate, and the like; the 4-nitro-4-alkyl-2,6-dioxacyclohexanones; the 4-tertiary amino-4-alkyl-2,6-dioxacyclohexanones; the 4,4-dialkoxymethyl-2,6-dioxacyclohexanones; the 4,4-dialkanoyloxymethyl-2, 6-dioxacyclohexanones; the 4-nitro-4-alkoxymethyl-2,6-dioxycyclohexanones; the 4-tertiary amino-4-alkoxymethyl-2,6-dioxacyclohexanones; the 4-nitro-4-alkanoyloxymethyl-2,6-dioxocyclohexanones; the 4-tertiary amino-4-alkanoyloxymethyl-2,6-dioxacyclohexanones; and other classes falling within the scope of Formula II supra (sans, of course, the proviso discussed above); the 4,4-di(halomethyl)-2,6-dioxyacyclohexanones such as the 4,4-di(chloromethyl)-2,6-dioxacyclohexanones prepared by cyclizing pentaerythritol dichloride with dialkyl carbonate as taught previously; 4,4-di(cyanomethyl)-2,6-dioxacyclohexanone prepared by reacting one mol of pentaerythritol dichloride with two mols of an alkali metal cyanide to thus yield the 2,2-di(cyanomethyl)-1,3-propanediol which, in turn, can be cyclized to give the subject carbonate; 3-chloromethyl-2,6-dioxacyclohexanone and 3-cyanomethyl-2,6-dioxacyclohexanone prepared by cyclizing 4-chloro-1,3-butanediol and 4-cyano-1,3-butanediol, respectively; the 4-substituted-4 - cyanoalkoxymethyl-2,6-dioxacyclohexanones wherein the 4-substituted moiety is hydrocarbyl, nitro, or tertiary amino such as those illustrated previously can be prepared by reacting a molar excess of 1-hydrocarbyl-1,1,1-trimethylolmethane or 1-nitro-1,1,1-trimethylolmethane with an alpha, beta-unsaturated nitrile such as the 2-alkenenitriles, e.g., acrylonitrile, and then cyclizing the 2-substituted 2-cyanoalkoxymethyl-1,3-propanediol to the corresponding carbonate; the nitro group (—NO₂) of the 2-nitro-2-cyanoalkoxymethyl-1,3-propanediols can be hydrogenated to the amino group (—NH₂), followed by alkylating the (—NH₂) group to the tertiary amino group (—NR₂), and then cyclizing the 2-tertiary amino-2-cyanoalkoxymethyl-1,3-propanediols to the 4-tertiary amino-4-cyanoalkoxymethyl-2,6-dioxacyclohexanones; the 4,4-di(cyanoalkoxymethyl)-2,6-dioxacyclohexanones prepared by reacting one mol of pentaerythritol with two moles of 2-alkenenitrile, e.g., acrylonitrile, to yield 2,2-di(cyanoalkoxymethyl)-1,3-propanediol, followed by cyclizing to produce the subject carbonate; 3-oxo-2,4,8-trioxaspiro[5.4]nonane prepared by reacting pentaerythritol monochloride in the presence of dilute alkali at about 60–120° C., and then cyclizing the resulting 3,3-dimehyloloxetane product to give the carbonate; 3-oxo-8-thia-2,4-dioxaspiro [5.3]nonane prepared by reacting pentaerythritol dichloride in the presence of sodium sulfide and an inert normally liquid organic vehicle, at about 60°–120° C., followed by cyclizing the resulting 3,3-dimethylolthietane product to yield the carbonate; 3-oxo-2,4,7-trioxaspiro[5.4]decane prepared by reacting tetrahydrofurfural with a molar excess of formaldehyde (note Equation 6 supra, and then cyclizing the 2,2-dimethyloloxacyclopentane product to the subject carbonate; 3-oxo-8-thia-2,4-dioxaspiro[5.3]nonane-8-oxide prepared by reacting a molar excess of 3,3-dimethylolthietane with peracetic acid and cyclizing the resulting 1-oxo-3,3-dimethylolthietane product; 3-oxo-8-thia-2,4-dioxaspiro[5.3]-nonane-8-dioxide prepared by reacting at least two mols of peracetic acid with 3,3-dimethylthietane, followed by cyclizing the resulting 1,1-dioxo-3,3-dimethylolthietane product; and the like.

The catalysts which are contemplated in the novel processes to prepare the novel polymeric gum stocks are characterized in detail herein below.

One class of catalysts are represented by the following formula:

(III)    $R_a-M-R_b$ wherein M represents a Group II metal in the Periodic Table,[1] for example, beryllium, magnesium, calcium, strontium, barium, zinc, or cadmium; wherein $R_a$ represents a monovalent hydrocarbon radical, a pyridyl radical, ---
[1] The Periodic Table referred to in this specification including the appended claims is the "Periodic Chart of the Atoms" contained in the text entitled "Key to Periodic Chart of the Atoms," by W. F. Meggers, 1956 edition, published by W. M. Welch Scientific Company, Chicago, Illinois.

or a furyl radical; and wherein $R_b$ represents hydrogen, halo, a monovalent hydrocarbon radical, a secondary amino radical, a hydrocarbyloxy radical, a pyridyl radical, or a furyl radical, and the like.

With reference to Formula III, the monovalent hydrocarbon radicals include aliphatic, aromatic, and alicyclic radicals as exemplified by alkyl, cycloalkyl, aryl, alkaryl, aralkyl, and the like. More specifically, illustrative hydrocarbon radicals include, for instance, methyl, ethyl, isopropyl, n-propyl, n-butyl, t-butyl, isobutyl, sec-butyl, aryl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclopentyl, 2-butylcyclohexyl, 3-methylcycloheptyl, phenyl, benzyl, ortho-, meta-, and para-tolyl, the xylyls, butylphenyl, phenethyl, phenylpropyl, phenylbutyl, and the like. Exemplary pyridyl radicals include, for example, 2-, 3-, and 4-pyridyl, alkyl-2-pyridyl, 3-methyl-2-pyridyl, 5-ethyl-2-pyridyl, 6-n-butyl-2-pyridyl, and the like. Illustrative furyl radicals include, for instance, 2- and 3-furyl, alkyl-2-furyl, 3-methyl-2-furyl, 3-propyl-2-furyl, and the like. Illustrative secondary amino radicals encompass, for instance, dimethylamino, diethylamino, di-n-propylamino, N-ethylpropylamino, di-2-ethylhexylamino, N-ethyl-m-toluidino, N-propyl-2,3-xylidino, N-methyl-anilino, N-isopropyl-benzylamino, N-phenyl-benzylamino, N-methyl-α-naphthalamino, N-cyclohexyl-heptylamino, 1-piperidyl, 1-pyrrolidyl, 1-pyrryl, and the like. Among the hydrocarbyloxy radicals can be listed, for instance, alkoxy, aryloxy, alkenyloxy, cycloalkyloxy, cycloalkenyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-toloxy, 2-propylphenoxy, butylphenoxy, n-undecylphenoxy, 2-phenethoxy, benzyloxy, allyloxy, 2-butenyloxy, 2-pentenyloxy, cyclopentyloxy, cyclohexyloxy, cycloheptyloxy, alkylcyclohexyloxy, cyclopentenyloxy, cyclohexenyloxy, cycloheptenyloxy, and the like. The halo radicals include chloro, bromo, and iodo.

Illustrative subclasses of organometallic catalysts which are encompassed within Formula III, supra include, for example, dialkylzinc, alkylzinc halide, alkylzinc alkoxide, dialkylberyllium, alkylberyllium halide, dialkylmagnesium, alkylmagnesium halide, alkylmagnesium alkoxide, dialkylcadmium, diarylzinc, alkylzinc dialkylamide, alkylmagnesium dialkylamide, and the like. Specific examples include, among others, diethylzinc, di-n-propylzinc, diisopropylzinc, di-n-butylzinc, di-t-butylzinc, diisobutylzinc, di-2-ethylhexylzinc, diphenylzinc, n-butylzinc butoxide, octylzinc chloride, phenylzinc bromide, dimethylmagnesium, dipropylmagnesium, propylphenylmagnesium, n-butylmagnesium chloride, diphenylmagnesium, phenylmagnesium chloride, dimethylberyllium, diethylberyllium, dipropylberyllium, di-n-butylberyllium, propylberyllium chloride, dimethylcadmium, diethylcadmium, dipropylcadmium, diisobutylcadmium, diisoamylcadmium, phenylcadmium iodide, butylzinc diethylamide, ethylzinc dipropylamide, phenylmagnesium diethylamide, 2-pyridylmagnesium chloride, 3-furylmagnesium iodide, 2-butenylzinc ethoxide, butylzinc allyloxide, and the like.

A second class of organometallic compounds which are contemplated as catalysts can be characterized by the following formula:

(IV)    $R'-M-R''_x$ wherein M is a Group III–B metal in the Periodic Table, e.g., aluminum, indium, and gallium; wherein $x$ is an integer having a value of 2; wherein R' is a monovalent hydrocarbon radical free of ethylenic and acetylenic unsaturation, e.g., alkyl, aryl, cycloalkyl, aralkyl, alkaryl, and the like; and wherein each R'', individually, is hydrogen; a halo radical, e.g., chloro, fluoro, bromo, or iodo; a hydrocarbyloxy radical, e.g., alkoxy, aryloxy, and the like; or a monovalent hydrocarbon radical free of ethylenic and acetylenic unsaturation, e.g., alkyl, aryl, cycloalkyl, aralkyl, alkaryl, and the like. Illustrative monovalent hydrocarbon radicals include, for example, methyl, ethyl, propyl, isobutyl, sec-butyl, t-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclohexyl, 2-butylcyclohexyl, 2-methylcycloheptyl, phenyl, benzyl, ortho-, meta-, and para-tolyl, the xylyls, butylphenyl, phenethyl, phenylpropyl, phenylbutyl, trimethylphenyl, and the like. Exemplary hydrocarbyloxy radicals include, for instance, methoxy, ethoxy, propoxy, isopropoxy, sec-butoxy, n-butoxy, t-butoxy, hexoxy, 2-ethylhexoxy, octoxy, dodecoxy, octadecoxy, phenoxy, phenethoxy, benzyloxy, ortho-, meta-, and para-toloxy, phenylpropoxy, phenylbutoxy, and the like. It is preferred that the R' and R" variables contain less than 12 carbon atoms.

Illustrative subclasses of organometallic catalysts encomposed within the scope of Formula IV supra include, for example, trialkylaluminum, alkylaluminum dihalide, dialkylaluminum alkoxide, dialkylaluminum halide, trialkylindium, diarylindium halide, trialkylgallium, and the like. Specific examples of the organometallic catalysts include trimethylaluminum, triethylaluminum, tri-n-propylaluminum, triisopropylaluminum, tri-n-butylaluminum, tri-t-butylaluminum, triisobutylaluminum, trioctadecylaluminum, dipropylaluminum chloride, diisopropylaluminum bromide, triethylgallium, trimethylindium, and the like.

A third class of compounds which are contemplated as catalysts can be characterized by the following formula:

(V) $\quad M(R)_y$ wherein M represents a Group II metal or a Group III metal in the Periodic Table, for example, beryllium, magnesium, calcium, strontium, barium, zinc, cadmium, aluminum, indium, or gallium; wherein each R represents a hydrocarbyloxy radical, e.g., alkoxy, cycloalkoxy, aryloxy, aralkoxy, alkaryloxy, and the like; and wherein $y$ represents an integer, i.e., 2 or 3, and depends for its value on the valence of M. Illustrative hydrocarbyloxy radicals include methoxy, ethoxy, n-propoxy, isopropoxy, n-butoxy, t-butoxy, sec-butoxy, isobutoxy, pentoxy, hexoxy, isohexoxy, 2-ethylhexoxy, n-octoxy, decoxy, dodecoxy, octadecoxy, cyclohexoxy, phenoxy, methylphenoxy, phenethoxy, and the like. It is preferred that R represents an alkoxy group which contains up to 10 carbon atoms, particularly 2 to 4 carbon atoms.

Another class of organometallic compounds which are contemplated as catalysts can be characterized by the following formula:

(VI) $\quad MR'$ wherein M represents a Group I-A metal in the Periodic Table, i.e., an alkali metal, for example, lithium, sodium, potassium, rubidium, or cesium; and wherein R' represents a monovalent hydrocarbon radical, a pyridyl radical, or a furyl radical.

The monovalent hydrocarbon radicals include aliphatic, aromatic, and alicyclic radicals as exemplified by alkyl, alkenyl, cycloalkyl, cycloalkenyl, aryl, alkaryl, arakyl and the like. More specifically, illustrative hydrocarbon radicals include, for instance, methyl, ethyl, isopropyl, n-propyl, n-butyl, t-butyl isobutyl, sec-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclopentyl, 2-butylcyclohexyl, 3-methylcycloheptyl, propenyl, allyl, 3-butenyl, the cyclopentenyls, the cyclohexenyls, the cycloheptenyls, the alkylcyclohexenyls, phenyl, benzyl, ortho-, meta-, and para-tolyl, the xylyls, butylphenyl, phenethyl, phenylpropyl, phenylbutyl, ethynyl, 1-butynyl, 2-butynyl, cinnamyl, naphthyl, trimethylphenyl, 9-fluorenyl, and the like. Exemplary pyridyl radicals include, for example, 2-, 3-, and 4-pyridyl, alkyl-2-pyridyl, 3-methyl-2-pyridyl, 5-ethyl-2-pyridyl, 6-n-butyl-2-pyridyl, and the like. Illustrative furyl radicals include, for instance, 2- and 3-furyl, alkyl-2-furyl, 3-methyl-2-furyl, 3-propyl-2-furyl, and the like.

Illustrative subclasses of organometallic catalysts encompassed within Formula VI surpra include, for example, alkylsodium, alkyllithium, alkylpotassium, alkylrubidium alkylcesium, arylsodium, aryllithium, arylpotassium, cycloalkylsodium, cycloalkylpotassium, the alkali metal naphthalenes, the alkali metal pyridyls, the alkyl metal furyls, and the like. The alkylmetals and arylmetals are preferred. Specific examples of the organometallic catalysts include, among others, methylsodium, ethylsodium, n-propylsodium, n-butylsodium, 2-ethylhexylsodium, n-octyllithium, dodecyllithium, ethylpotassium, isopropylpotassium, n-butylpotassium, n-dodecylpotassium, phenyllithium, phenylsodium, phenylpotassium, 3-tolylsodium, 3-para-xylyllithium, 2-n-propylphenylsodium, cyclopentylsodium, cyclohexylpotassium, 3-n-butylcyclohexyllithium, cycloheptylpotassium, 4-n-octylcyclohexylsodium, phenethylsodium, benzyllithium, phenylpropylpotassium, 9-fluorenylpotassium, sodium naphthalene, potassium naphthalene, lithium naphthalene, vinylsodium, propenyllithium, 3-butenyllithium, 2-butenylpotassium, allylsodium, 2-pyridylsodium, 2-pyridylpotassium, 2-pyridyllithium, alkyl-2-pyridylsodium, alkyl-2-pyridyllithium, alkyl-2-pyridylpotassium, 3-n-propylpyridylsodium, 3-ethylpyridylpotassium, 2-furylsodium, 3-furylpotassium, 2-furyllithium, alkyl-2-furyllithium, alkyl-2-furylsodium, alkyl-2-furylpotassium, 3-methyl-2-furylpotassium, 3-n-butyl-2-furyllithium, 4-ethyl-2-furylsodium, and the like.

In addition, various amide-containing compounds are contemplated as catalysts in the novel processes of the invention, namely, (a) the divalent metal amides, i.e., $H_2N$—M—$NH_2$, (b) the divalent metal amide-alcoholates, and (c) mixtures of divalent metal amides and divalent metal amide-alcoholates, the metal portion (M) of which has an atomic number greater than 11 and less than 57 and is found in Group II of the Periodic Table. These divalent metals include magnesium, zinc, calcium, strontium, cadmium, and barium. The amides of magnesium and alkaline earth metals, i.e., strontium, barium, and calcium, are preferred.

The divalent metal amide-alcoholates are characterized by the following formula:

(VII) $\quad H_2N$—M—$OR_1$ wherein M is a divalent metal which has an atomic number greater than 11 and less than 57 from Group II of the Periodic Table, i.e., magnesium, calcium, zinc, strontium, cadmium, and barium; and wherein $R_1$ is a monovalent hydrocarbon radical, e.g., alkyl cycloalkyl, aryl, alkaryl, aralkyl, alkenyl, cycloalkenyl, and the like. Representative $R_1$ radicals include, among others, methyl, ethyl, propyl, isopropyl, butyl, isobutyl, t-butyl, 2-ethylhexyl, 2,4,4-trimethylpentyl, decyl, dodecyl, octadecyl, cyclopentyl, cyclohexyl, 2-methylcyclopentyl, 3-amylcyclohexyl, cycloheptyl, phenyl, benzyl, tolyl, xylyl, ethylphenyl, hexylphenyl, octylphenyl, phenethyl, phenylpropyl, phenylbutyl, allyl, 3-butenyl, 3-pentenyl, cyclopentenyl, cyclohexenyl, cycloheptenyl, and the like. In a preferred aspect, the $R_1$ variable is an alkyl radical which contains from 1 to 10 carbon atoms. In a further preferred aspect, $R_1$ is a lower alkyl, e.g., methyl, ethyl, n-propyl, butyl, and the like. It is further preferred that the divalent metal (M) be an alkaline earth metal, i.e., calcium, strontium, or barium. Of the alkaline earth metals calcium is highly preferred.

The divalent metal amide as well as the divalent metal amide-alcoholate can be prepared by various routes. These routes are set forth in detail in U.S. Patent No. 3,021,311.

Another class of catalysts which are employed in the novel processes of the invention are prepared by the mutual reaction and/or interaction of an alkaline earth metal hexammoniate, i.e., calcium, barium, or strontium hexammoniate, an olefin oxide, and an organic nitrile.

The reaction is carried out in a liquid ammonia medium. In principle, the reaction temperature can range from above about the freezing point of ammonia, i.e., about −78° C., to the critical temperature of ammonia, i.e., about +133° C. The preservation of a liquid ammonia phase obviously requires pressurized equipment at reaction temperatures above the atmospheric boiling point of ammonia, i.e., about −33° C. A reaction temperature in the range of from above about the freezing point of the liquid ammonia medium to about 25° C. is preferred. In a more preferred aspect the upper temperature limitation is about 10° C.

The ratio of the three components, i.e., alkaline earth metal hexammoniate, olefine oxide, and organic nitrile, can be varied over a wide range in the preparation of the catalysts. The reaction is conducted, as indicated previously, in an excess liquid ammonia medium. Thus, very active catalysts can be prepared by employing from about 0.3 to 1.0 mol of olefin oxide per mol of metal hexammoniate, and from about 0.2 to 0.9 mol of organic nitrile per mol of metal hexammoniate. Extremely active catalyst can be prepared by employing from about 0.4 to 1.0 mol of olefin oxide per mol of metal hexammoniate, and from about 0.3 to 0.8 mol of organic nitrile per mol of metal hexammoniate. It should be noted that the alkaline earth metal hexammoniate, $M(NH_3)_6$, wherein M can be calcium, barium, or strontium, contains alkaline earth metal in the zero valence state. Thus, the concentration or mol ratio of the olefin oxide and the organic nitrile is more conveniently based upon alkaline earth metal per se rather than alkaline earth metal hexammoniate.

The olefin oxides contemplated as reagent in the preparation of the catalysts are those containing solely carbon, hydrogen, and oxirane oxygen which is bonded to vicinal or adjacent carbon atoms to form an epoxy group, i.e.,

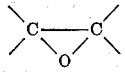

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]hexane, 3-methyl-6-oxabicyclo[3.1.0]hexane, 4-ethyl-6-oxabicyclo[3.1.0]hexane, and the like. Lower olefin oxides are preferred, that is, ethylene oxide, propylene oxide, 1,2-epoxybutane, 2,3-epoxybutane, and the like.

The organic nitriles which are employed in the catalyst preparation, are preferably, the saturated aliphatic nitriles. Among the organic nitriles which are contemplated, include, for example, acetonitrile, propionitrile, butyronitrile, valeronitrile, isovaleronitrile, capronitrile, caprylonitrile, caprinitrile, and the like. Lower saturated aliphatic organic nitriles are preferred, that is, acetonitrile, propionitrile, butyronitrile, and the like. Acetonitrile is most preferred.

In the preparation of the aforesaid catalysts, it appears that the olefin oxide reagent becomes bonded to the alkaline earth metal through the oxygen atom, i.e., R—O—M— wherein R would be ethyl when the olefin oxide is ethylene oxide, and M is the alkaline earth metal. However, analyses indicate that very little, if any, of the organic nitrile reagent is contained in the final product. Moreover, tests indicated the presence of alkylideneimine, e.g., ethylidene, which is probably formed by the reduction of organic nitrile, e.g., acetonitrile, by the metal, e.g., calcium in liquid ammonia.

The preparation of the aforesaid catalysts can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and organic nitrile reagents, preferably as a mixture. If desired, the olefin oxide and organic nitrile reagents can be added separately. However, it is preferred that the separate addition of said reagents to the ammonia solution be conducted simultaneously. During the catalyst preparation agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried in an inert, normally-liquid organic vehicle such as, for example, lower dialkyl ether of alkylene glycol, e.g., the dimethyl-, diethyl-, or dipropyl ethers of diethylene glycol; dioxane; decahydronaphthalene; saturated aliphatic and cycloaliphatic hydrocarbons, e.g., hexane, heptane, cyclohexane, or 2-methylcycloheptane; and the like.

In practice, it has been found extremely desirable to employ a promoter and/or co-catalyst and/or chelating agent with the hydrocarbyl Group II metals and hydrocarbyl Group III–B metals encompassed within the scope of Formulae III and IV supra. Suitable promoters and/or co-catalysts and/or chelating agents are, for example, alkanols, phenols, ketones, molecular oxygen, the polyols, (aliphatic and aromatic), the diketones such as the acylacetones, the ketoesters, the ketoacids, the ketoaldehydes, the oximes such as ketoxime, other active hydrogen compounds, and mixtures thereof. The promoters and/or co-catalysts and/or chelating agents are extremely effective with dialkylzinc, e.g., dibutylzinc, diethylzinc, etc., and trialkylaluminum, e.g., triisobutylaluminum. The hydrocarbyl Group II metal and hydrocarbyl Group III–B metal compounds can be admixed or reacted with the aforesaid promoters and/or co-catalysts and/or chelating agents prior to effecting the polymerization reaction, or each can be admixed or reacted in situ.

Illustrative alkanols include methanol, ethanol, n-propanol, isopropanol, n-butanol, n-hexanol, lauryl alcohol, cetyl alcohol, stearyl alcohol, and the like. Particularly desirable alkanols are those which contain up to 10 carbon atoms.

Illustrative phenols include, by way of examples, the monohydric phenols, e.g., phenol, ortho-, meta-, and para-cresol, ortho-, meta-, and para-chlorophenol, the naphthols, and the like; the polyhydric phenols such as catechol, hydroquinone, resorcinol, pyrogallol, and the like, the di- and polynuclear phenols such as the bisphenols described in U.S. Patent No. 2,506,486 and the polyphenylols which result from the condensation of a phenol and an aldehyde or ketone (cf. Phenoplasts by T. S. Carswell, published 1947 by Interscience Publishers, New York).

Other illustrative active hydrogen compounds include, for instance, methyl ketone, ethyl ketone, propyl ketone, methyl ethyl ketone, acetonylacetone, acetylacetone, 3-methyl-2,4-pentanedione, ethyl acetoacetate, formylacetone, hydroxyacetone, salicylaldehyde, 2-hydroxyethyl acetate, diethyl malonate, malonaldehyde, glyoxal monoxime, dimethyl glyoxime, 2-nitroacetice acid, and the like. It is desirable to employ up to about 0.6 equivalent of active hydrogen compound per equivalent of the organometallic compound.

In addition to the foregoing, water is an extremely desirable promoter for the hydrocarbyl Group II metals, e.g., the alkylzincs such as diethylzinc, diisopropylzinc, di-n-propylzinc, di-n-butylzinc, diisobutylzinc, di-t-butylzinc, di-sec-butylzinc, n-butylzinc butoxide, etc., as well as the mono-, di-, and tri-hydrocarbyl Group III metals such as mono-, di-, and trialkylaluminums, e.g., triethylaluminum, triisopropylaluminum, tri-n-propylaluminum, tri-n-butylaluminum, tri-sec-butylaluminum, triisobutylaluminum, tri-t-butylaluminum, the corresponding dialkylaluminum hydrides and monoalkylaluminum dihydrides such as diisobutylaluminum hydride, isobutylaluminum dihydride, and others. The amount of water can vary over a wide range, e.g., from about 0.01 to about 0.3 mols, and higher, per mol of the hydrocarbyl Group II metals, and from about 0.01 to about 0.6 mol, and higher, per mol of the hydrocarbyl Group III metals. It is preferred that up to about equimolar quantities of water to hydrocarbyl Group II metals or hydrocarbyl Group III metals be employed. As indicated previously, the organometallic compound can be premixed and/or prereacted with the active hydrogen compound, e.g., water, and the resulting mixture then can be employed as the catalytic medium. Alternatively, the organometallic compound as well as the active hydrogen compound can be admixed or reacted in situ. Though the addition or inclusion of water to the organometallic compound has been termed a promoter, etc., in reality, however, a reaction occurs. Thus, for example, equimolar quantities of water and trihydrocarbylaluminum, such as triisobutylaluminum, results in poly(isobutylaluminum oxide) which has the recurring unit

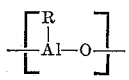

wherein R is hydrocarbyl such as isobutyl.

In addition to the aforesaid catalytic formulations, a system composed of an aluminum trialkoxide, e.g., aluminum triisopropoxide, and a zinc halide, such as zinc chloride, zinc bromide, etc., is also desirable in effecting the polymerization reaction. The amount of zinc halide can vary over a wide range, e.g., from about 0.01 to about 1.0, and higher, mol per mol of aluminum trialkoxide. Approximately, equimolar quantities of zinc halide and aluminum trialkoxide are preferred.

The catalysts are employed in catalytically significant quantities. For optimum results, the particular catalyst employed, the nature of the monomeric reactants, the operative conditions under which the polymerization reaction is conducted, and other factors, will largely determine the desirable catalyst concentration. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is generally preferred.

The polymerization reaction can be conducted over a wide temperature range. Depending upon various factors such as the nature of the monomeric reactants employed, the particular catalyst employed, the concentration of the catalyst, and the like, the reaction temperature can be as low as −20° C., and lower, and as high as 250° C., and higher. A suitable temperature range is from about 0° C. to about 200° C.

In general, the reaction time will vary depending upon the operative temperature, the nature of the monomeric reactants employed, the particular catalyst and concentration employed, the use of an inert normally liquid organic vehicle, and other factors. The reaction time can vary from several seconds to several days depending upon the variables illustrated immediately above. A feasible reaction period is from about a few minutes to about 10 hours, and longer.

The polymerization reaction preferably is initiated in the liquid phase. It is desirable to effect the polymerization reaction under an inert atmosphere, e.g., nitrogen.

The polymeric gum stocks of this invention can be prepared via the bulk polymerization, suspension polymerization, or the solution polymerization routes. The polymerization reaction can be carried out in the presence of an inert normally-liquid organic vehicle such as, for example, aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reactants does not appear to be critical. A suitable procedure is to add the catalyst to the reaction zone containing the monomeric reactants and inert organic vehicle, if any. If desired, the catalyst can be in solution or suspension (in an inert normally-liquid organic vehicle). Incremental addition of catalyst to the reaction zone can be employed. If desired, the above procedure can be reversed, that is, the monomeric reactants per se or as a solution in an inert organic vehicle can be added to the reaction zone containing the catalyst (or a catalyst solution). Also, the catalyst, reactants, and inert organic vehicle, if any, can be added to the reaction zone simultaneously. The reaction zone (be it, for example, a closed vessel or an elongated tube) can be fitted with an external heat exchanger to thus control undue temperature fluctuations, or to prevent any possible "run-away" reaction temperatures due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

The proportion of the reactants, i.e., the cyclic ester monomer(s) and cyclic carbonate monomer(s) can vary over a wide range. Thus, the concentration of the reactants can be from about 1, and lower, to about 99, and higher, mol percent, based on the total mols of the reactants.

Unreacted monomeric reagent oftentimes can be recovered from the reaction product by conventional techniques such as by heating said reaction product under reduced pressure. Removal of unreacted monomeric reactant(s) and/or inert organic vehicle can be accomplished by mechanical means such as treatment of the reaction product in a Marshall Mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously.

The polymers obtained by the processes of the invention are a useful class of polycarbonate polyester compounds. These polymers can range from viscous liquids to extremely tough solids. The very viscous liquids to relatively low molecular weight, wax-like products are useful in the preparation of cosmetics, polishes, and waxes, and as thickening agents for various lubricants. The polymers can be employed to size cellulosic material or they can be used as anti-static agents in the treatment of fibrous materials. They can also be employed as protective coatings and impregnants. These polymers are also useful as oil additives. The solid polymers are useful for the production of various shaped articles such as brush handles, buttons, lamp bases, toys, and the like. The crystalline polymers can be shaped into useful fibers by conventional means such as by extrusion. The solid crystalline and non-crystalline polymers also are useful in the preparation of films by such techniques as milling on a two-roll mill, calendering, solvent casting, and the like. The polymers are also useful as plasticizers for vinyl resins.

It should be noted, also, that an additional advantage afforded by the practice of the invention is the preparation of polymers whose physical characteristics can be "tailor-made" to fit desired fields of applications and uses. For example, by adjusting the concentration of the monomeric charge to a particular polymerization system polymers which cover a wide spectrum of properties and characteristics can be prepared, e.g., soft, rubbery polymers to highly crystalline polymers.

The novel polymeric gum stocks are substantially linear polyester polycarbonate polymeric products which result from the polymerization of an admixture which contains (1) at least one cyclic ester monomer which is characterized by Formula I supra, with (2) at least one cyclic carbonate monomer which contains (a) at least 6 atoms, preferably 6 atoms, in the ring nucleus including the carbonate group, (b) at least one carbon to carbon double bond, and (c) no more than 4 substituents or groups bonded to the carbon atoms of the ring nucleus which contains the carbonate group. The novel substantially linear polyester polycarbonate polymers can be characterized by the following recurring structural units:

(VIII)

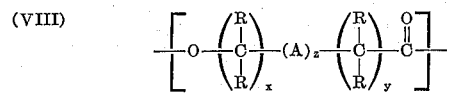

wherein the variables R, A, x, y, and z have the same values as shown in Formula I supra; and (IX)

wherein $R_1$ represents a divalent aliphatic chain which contains at least 3 carbon atoms, said $R_1$ being monovalently bonded to both oxy atoms (—O—) in the above structural unit through carbon atoms, said $R_1$ being further characterized in that it contains at least one carbon to carbon double bond and no more than four substituents along the divalent aliphatic chain. The proportions of each Unit VIII and Unit IX supra in the novel polymeric gum stock can be from about 0.25, and lower, to about 99.75, and higher, mol percent, based on the total mols of monomers polymerized therein. It is preferred, however, that the novel polymers comprise a major mol percent of Unit VIII and a minor mol percent of Unit IX therein. It is pointed out at this time that the terms "polymer(s)" or "polymeric," as used herein, are meant the reaction products resulting from the polymerization reaction of an admixture containing two or more polymerizable monomers therein. As is readily appreciated, this admixture will contain at least one cyclic ester as exemplified by Formula I supra, at least one cyclic carbonate which contains an ethylenic bond, and optionally, at least one cyclic carbonate which is free from ethylenic unsaturation and acetylenic unsaturation.

The novel polyester polycarbonate polymer can range from the liquid state to extremely high molecular weight tough solids, for example, from about 700 to the low millions. The ultimate molecular weight and properties of the novel polymers will depend, in the main, upon the choice of the cyclic ester(s), the choice of the cyclic carbonate(s), the choice of the catalyst, the concentration of the reactants and the catalyst, the operative conditions employed, e.g., temperature, etc., the purity of the reactants, and the like. A preferred average molecular weight of the novel polymeric gum stocks is from upwards of about 4,000, and more preferably from upwards of about 20,000. The upper limit re the average molecular weight of the novel gum stocks can be as high as two million, and higher; however, it is preferred that the average molecular weights of the gum stocks be up to about 800,000, since many of the commercially useful applications are below this figure.

A particularly preferred class of novel polymeric gum stocks are those essentially linear polyester polycarbonate polymers which contain at least about 50 mol percent, and preferably still at least about 80 mol percent, of the following recurring unit:

(X)

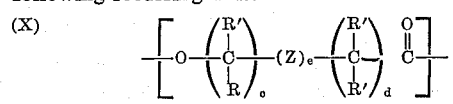

wherein each R', individually, can be hydrogen, alkyl, alkoxy, halo, haloalkyl, and alkoxyalkyl, which preferably contain up to 8 carbon atoms; wherein subscripts $c$ and $d$, individually, are integers having a value greater than zero and less than 5; wherein subscript $e$ is an integer which has a value of zero or one; wherein the sum of $c+d+e$ is an integer greater than one and less than 8, preferably greater than 3 and less than 7, and more preferably the integer 5; and wherein Z is an oxy group, i.e., —O— group, or the unit

wherein the R' variables of said unit have the same values above; with the provisos (1) that no more than three R' variables attached to the carbon atoms contained in the cyclic ester ring are groups other than hydrogen, (2) that from 2 to 4 continuously linked carbon atoms contained in the cyclic ester ring can represent a portion of a saturated cycloaliphatic hydrocarbon nucleus which contains from 4 to 10 carbon atoms in said nucleus, preferably from 5 to 7 carbon atoms in said nucleus, (3) that four R' variables attached to any two adjacent carbon atoms contained in the cyclic ester ring can represent a portion of a fused aromatic hydrocarbon nucleus, and wherein the sum of $c+d+e$ cannot be an integer equal to 3. With reference to provisio (2) immediately above, the saturated cycloaliphatic hydrocarbon nucleus can be considered to be derived, for example, from cycloalkane, alkyl-substituted cycloalkane, cyclobutane, cyclopentane, ethylcyclohexane, n-propylcyclohexane, n-octylcyclohexane, cycloheptane, cyclooctane, and the like. With reference to proviso (3) immediately above, the aromatic hydrocarbon nucleus can be considered to be derived, for example, from benzene, alkylbenzene, ethylbenzene, n-propylbenzene, 2-ethylhexylbenzene, naphthalene, alphamethylnaphthalene, and the like. Specific illustrative radicals falling within the scope of the R' variables of Unit X are found under the discussion of the R variables of Formula I supra. In view of economic and practical considerations, it is highly preferred that the R' variables be hydrogen and/or methyl.

In addition to Unit X, these particular preferred novel polymeric gum stocks contain up to about 50 mol percent, and preferably still up to about 20 mol percent, of the following recurring unit:

(XI)

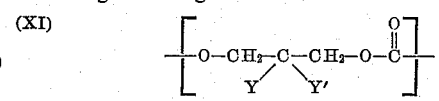

wherein Y and Y' have the same values as shown in Formula II supra. It is preferred that Y be alkyl which preferably contains from 1 to 6 carbon atoms; alkenyl which preferably contains from 2 to 6 carbon atoms;

alkenyloxymethyl, the alkenyl moiety of which preferably contains from 2 to 6 carbon atoms; alkenoyloxymethyl, the alkenoyl moiety of which contains from 3 to 6 carbon atoms; and nitro; and Y' be alkyl which preferably contains from 1 to 6 carbon atoms; alkenyl which preferably contains from 2 to 6 carbon atoms; alkenyloxymethyl, the alkenyl moiety of which preferably contains from 2 to 6 carbon atoms; and alkenoyloxymethyl, the alkenoyl moiety of which contains from 3 to 6 carbon atoms; and Y and Y' together with the gem carbon atom of Unit IX above can be a divalent ethylenically unsaturated carbocyclic or heterocyclic nuclei which contains from 5 to 8 atoms in the nuclei such as, for example, 4,4-cyclohexenylene, bicyclo[2.2.1]hept-2-en-6,6-ylene, bicyclo[2.2.2]-oct-2-en-6,6-ylene, 2-alkenyl-1,3-dioxacyclohex-5,5-ylene, and 3-oxacyclohexen-4,4-ylene. Of course, the choice of Y and Y' is such that the Unit XI contains at least one carbon to carbon double bond.

In a further desirable embodiment, the invention is directed to novel substantially liner polymeric gum stocks which comprise up to about 95 mol percent of Unit VIII supra, up to about 25 mol percent of Unit IX supra, and up to about 60 mol percent of the recurring unit:

(XII)

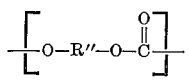

wherein R'' represents a divalent alkylene or oxa-alkylene chain of at least 3 carbon atoms and upwards to 18 atoms, preferably 3 carbon atoms in said chain. Moreover, there can be from zero to 4 substituents or groups along said chain which are free from ethylenic and acetylenic unsaturation. It is preferred that these substituents be composed of carbon and hydrogen with or without oxygen atoms, said oxygen being present in the form of etheric oxygen (—O—), esteric oxygen $$-\overset{O}{\underset{}{\overset{\parallel}{C}}}O-$$

and/or nitro oxygen (—$NO_2$), e.g., alkyl, aryl, cycloalkyl, alkaryl, aralkyl, alkoxymethyl, haloalkyl, cyanoalkyl, alkanoyloxymethyl, alkoxy, nitro, cyanoalkoxymethyl, and aryloxymethyl. It is also preferred that one substituent be nitro, tertiary amino, cyanoalkyl, or cyanoalkoxymethyl. It is especially preferred that R'' of Unit XII be a 2,2-disubstituted trimethylene radical, for example, 2,2-dialkyltrimethylene, 2,2-di(cyanoalkyl)trimethylene, 2,2-di(haloalkyl)trimethylene, 2,2-di(cyanoalkoxymethyl)trimethylene, and the like. It is highly preferred that the alkyl portion and the alkoxy portion of the aforesaid 2,2-disubstituted radicals contain from 1 to 4 carbon atoms. From an over-all standpoint concerning economics, practical commercial significance, and other factors, 2,2-dimethyltrimethylene, i.e.,

2,2-di(cyanomethyl)trimethylene, 2,2-di(chloromethyl)trimethylene, and 2,2-di(cyanoethoxymethyl)trimethylene form the saturated R'' variable of choice.

In highly eminent embodiments, the invention is directed to novel substantially linear polyethylenically unsaturated polymeric gum stocks which comprise up to about 99.75 mol percent, preferably from about 50 to about 99.75 mol percent, of the recurring unit:

(XIII)

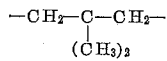

wherein each R' is hydrogen or lower alkyl, preferably hydrogen or methyl, with the proviso that no more than 3 R' variables are substituents other than hydrogen; and at least about 0.25 mol percent, and preferably from about 0.5 to about 15 mol percent, of one or more of the following recurring units:

(XIV)

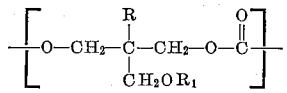

wherein R is alkyl, preferably lower alkyl, and preferably still ethyl; and wherein $R_1$ is alkenyl, preferably lower alkenyl, and preferably still allyl; and/or (XV)

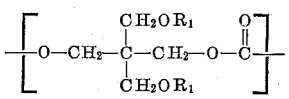

wherein each $R_1$ have the same meanings as assigned in Unit XIV supra; and/or (XVI)

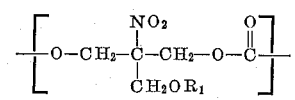

wherein $R_1$ has the same meanings as assigned in Unit XIV supra; and/or (XVII)

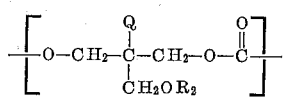

wherein Q is alkyl, preferably lower alkyl; alkenoyloxymethyl, preferably lower alkenoyloxymethyl; or nitro; and wherein $R_2$ is alkenoyl, preferably lower alkenoyl, and preferably still, propenoyl.

In addition, the novel polymeric gum stocks of the preceding highly eminent embodiments can contain from zero to about 60 mol percent, preferably from zero to about 40 mol percent of one or more of the following recurring units:

(XVIII)

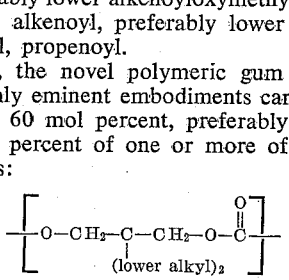

wherein each lower alkyl variable contains from 1 to 6 carbon atoms, preferably 1 to 2 carbon atoms, and preferably still each lower alkyl is methyl; and/or (XIX)

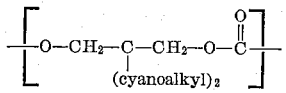

wherein each cyanoalkyl variable contains from 1 to 4 carbon atoms, and preferably wherein each cyanoalkyl variable is cyanomethyl; and/or (XX)

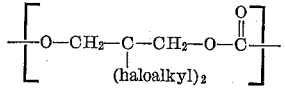

wherein each haloalkyl variable contains from 1 to 4 carbon atoms, and preferably wherein each haloalkyl variable is chloromethyl; and/or (XXI)

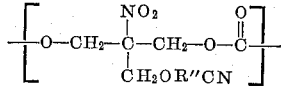

wherein R'' is alkylene, preferably alkylene of 2 to 4 carbon atoms, and preferably still R'' is ethylene

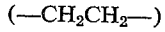

and/or (XXII)

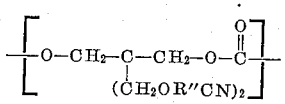

wherein each R'' has the meanings assigned in Unit XXI supra.

It is manifest that the novel polymeric gum stocks contain a plurality of ethylenic bonds therein, and, in general, these gum stocks contain a plurality of pendant or dangling ethylenic sites along the polymer chain. Those polymeric gum stocks which contain a plurality of pendant terminally unsaturated alkenyloxymethyl groups, e.g., allyloxymethyl, along the polymer chain are extremely valuable as cross-linking sites to produce outstanding vulcanizates, especially elastomeric vulcanizes.

It is pointed out that the recurring linear carbonate units and recurring linear lactone units which comprise the novel polymeric gum stocks are interconnected through the oxy group (—O—) of one unit with the carbonyl group

of a second unit. In different language, the interconnection of these units do not involve the direct bonding of two carbonyl groups, i.e.,

Moreover, since a wide range of the novel polymeric gum stocks are exceptionally high molecular weight products, the end groups are insignificant since macromolecules are involved. However, the end groups will depend upon the catalyst of choice, the purification techniques of the reaction product mixture, and other factors. Infra-red analysis fails to disclose the terminal moieties of the relatively high molecular weight polymeric molecules. The end groups, in general, are monovalent organic moieties such as hydrocarbyl, hydrocarbyloxy, acyl, etc., e.g., alkyl, alkoxy, aryloxy, alkanoyl, cycloalkyl, and the like. The polymer chain can also be terminated by the metal containing catalyst residue which often times can be removed by conventional purification techniques, exposure to the atmosphere, and other procedures well known in the polymer art. These techniques frequently result in the formation of hydroxy end groups.

The novel essentially linear polyester polycarbonate polymers also can be characterized by their reduced viscosity values. Those novel essentially linear polymers which contain the recurring units

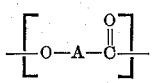

and

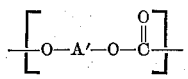

A and A′ being divalent saturated aliphatic hydrocarbon chains with A′ containing pendant group(s) which has ethylenic unsaturation, possess a reduced viscosity value of upwards of about 0.1, preferably upwards of about 0.5, and more, preferably upwards of about 0.8, and still more preferably upwards of about one. The upper value of the reduced viscosity range can be about 30, and higher, though a value of about 15 and oftentimes as low as 7 represent preferred maximum reduced viscosity values.

Those novel essentially linear polymers which contain the recurring unit

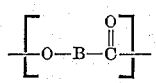

and/or

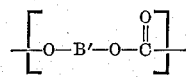

B and B′ being divalent saturated aliphatic oxa-hydrocarbon chains, the oxa (—O—) atom(s) being internal within said chains, e.g., —CH$_2$—CH$_2$—O—CH$_2$—CH$_2$—, —CH$_2$—CH$_2$—O—CH$_2$—, etc., (B′ of course, containing pendant group(s) which has ethylenic unsaturation, possess a reduced viscosity value of upwards of about 0.1, and preferably upwards of about 0.2. The upper value of the reduced viscosity range can be about 15, and higher, though a value of about 7 is preferred.

In a particularly preferred embodiment, the invention is directed to novel vulcanizates, especially the novel elastomeric vulcanizes, which result from cross-linking the novel polymeric gum stocks. Many of the novel elastomeric vulcanizates in this embodiment exhibit highly desirable and unexpected properties which, in several instances, are equivalent to, or superior to synthetic rubbers and/or natural rubber.

A major shortcoming of many elastomers such as the synthetic rubbers is the tendency of the elastomer to stiffen excessively at low temperature, lack sufficient tensile strength for a desired application, or gradually lose their flexibility over a period of time. Loss of the aforementioned properties, particularly flexibility, can ultimately lead to failure by cracking, or other undesirable feature of the elastomer itself or articles containing the elastomer. Fabricators of natural and synthetic elastomers have long sought a relatively inexpensive product that would exhibit excellent tensile strength, good tear strength, and/or outstanding crack resistance. Some progress in this direction has been made with various synthetic elastomers. The novel vulcanizates, however, particularly the novel elastomeric vulcanizates of this embodiment, exhibit excellent characteristics such as outstanding high temperature performance, resistance to attack by oxygen, ozone, etc., while also exhibiting mechanical properties which compare favorably with, and oftentimes are superior to, many of the commercially available synthetic and natural rubbers.

The novel polymeric gum stocks vary from essentially amorphous polymeric materials to highly crystalline polymeric materials depending, in the main, upon the choice of the monomeric reactants. The novel gum stocks especially those polyethylenic gum stocks which possess a reduced viscosity of at least about 0.5, more preferably at least about 0.8, and still more preferably at least about one, are admirably suited for the preparation of novel vulcanizates especially the novel elastomeric vulcanizates which exhibit a myriad of outstanding characteristics. By the term "reduced viscosity" is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solution. This reduced viscosity value is an indication of the molecular weight of the polymeric gum stock. Unless otherwise indicated, the reduced viscosity value is measured at a concentration of 0.4 gram of said polymeric gum stock in 100 milliliters of chloroform (or other common solvent) at 30° C.

As indicated previously, the novel polymeric gum stocks can be cured according to various procedures. A highly desirable cure can be effected by conventional vulcanization agents, e.g., sulfur, peroxides, etc., or other techniques, e.g., radiation, etc., employed in the natural and synthetic rubber arts. The term "sulfur," as used herein, is also meant to include organic sulfur-containing vulcanization agents such as, for example, the thiuram polysulfides, and the like. Other ingredients oftentimes employed in the rubber arts are illustrated in the text "Synthetic Rubber" by G. S. Whitby, John Wiley and Sons, Inc., New York (1954), for example, chapter 11 therein.

Suitable peroxides include among others, benzoyl peroxide, acetyl peroxide, dicumyl peroxide, cumene hydroperoxide, di-t-butyl peroxide, diisopropyl peroxydicarbonate, t-butyl perbenzoate, t-butyl peracetate, dibutyryl peroxide, dimethyl peroxide, diethyl peroxide, bis(2,4-dichlorobenzoyl) peroxide, bis(para-chlorobenzoyl) peroxide, 2,5-dimethylhexane-2,5-dihydroperoxide, and the like. By the term "peroxide," as used herein, is meant an organic compound which contains the structure —O—O— therein. Oftentimes, when a peroxide is used in conjunction with sulfur, the resulting novel vulcanizate frequently exhibits enhanced properties.

In general, the quantity of vulcanization agent employed, e.g., sulfur, to effect cross-linking of the novel polymeric gum stock will be an amount sufficient to impart the desired properties to the cured product. The amount employed will, of course, be dependent, in part, upon the degree of unsaturation present in the polymeric gum stock, the molecular weight of said gum stock, the curing conditions, the vulcanization agent of choice, the incorporation of various compounding and/or modifying ingredients into the gum stock such as fillers, extenders, plasticizers, anti-oxidants, etc., and other factors. Consequently, no hard and fast rule can be set forth with regard to the concentration of the vulcanization agent. However, those familiar with the rubber art and especially the vulcanization area of the rubber art can readily determine by mere routine experimentation the desired concentration to be employed for optimum conditions and properties.

The use of accelerators is desirable to increase the rate of vulcanization of the novel polymeric gum stock. Organic accelerators which are useful to enhance the cure of the gum stock are, among others, the organic bases, e.g., p-phenylenediamine; p-amino-dimethylaniline; p-nitrosodimethylaniline; "aldehydeamines" such as the condensation products of formaldehyde, acetaldehyde, butyraldehyde, and other aldehydes with amines such as aniline, toluidines, butylamine and the like; diphenylguanidine; di-orthotolylguanidine salt of dicatechol borate; and the like; various sulfur compounds such as thiocarbanilide; 2-mercaptobenzothiazole; the zinc salt of 2-mercaptobenzothiazole; 2-benzothiazolyl disulfide; the benzoyl and the 2,4-dinitrobenzoyl esters of 2-mercaptobenzothiazole; N-cyclohexyl-2-benzothiazole sulfenamide; and the other 2-mercaptobenzothiazole derivatives such as those listed in the book "Introduction to Rubber Technology," by Maurice Morton, Reinhold Publishing Corp., New York (1959), for example, chapter 5 therein. Illustrative of further accelerators useful in the cure of the gum stock are, among others, 2-mercaptoimidazoline; 1,2-dimethyl 2-mercaptoimidazoline; and other aliphatic thiazoles; the bismuth, copper, lead, potassium, sodium, and zinc salts of the dimethyl-, the diethyl-, the dibutyl-, the dibenzyl-, and the pentamethylenedithiocarbamates; piperidinium pentamethylenedithiocarbamate; the thiuram sulfides like tetramethylthiuram monosulfide, tetramethylthiuram disulfide, tetramethylthiuram disulfide, tetramethylthiuram tetrasulfate, tetraethylthiuram disulfide, tetraethylthiuram trisulfate, tetraethylthiuram tetrasulfate, dipentamethylenethiuram tetrasulfate, and the like.

Additionally, many accelerators require accelerator activators to develop the best quality in the cured gum stock. For example, zinc oxide and fatty acids like stearic acid are desirable accelerator activator systems. Further activators include among others, litharge, magnesium oxide, amines, amine soaps, and the like.

Various other modifying agents can be added to the novel polymeric gum stocks to improve the chemical and/or physical characteristics of the novel vulcanizates. For instance, age resistors which protect the products against deterioration attributed to atmospheric exposure such as, for example, the effect of oxygen and ozone, are preferably incorporated during the compounding step. Such anti-oxidants and anti-ozonants include organic amines, phenolic compounds, quinolines, and phosphites. Illustrative organic amines are, among other, N-phenyl-alpha-naphthylamine; N-phenyl-beta-naphthylamine; 4,4'-dioctyldiphenylamine; 4,4'-dinonyldiphenyl amine; para-(para-tolylsulfonylamido)-diphenylamine; 4,4'-dimethoxydiphenylamine; 4,4'-isopropoxydiphenylamine; N,N'-diphenylethylenediamine; N,N' - diortho-tolyl - ethylenediamine; N,N' - diphenyl - para - phenylenediamine; di - beta - naphthyl - para - phenylenediamine; N-cyclohexyl - N' - phenyl-para-phenylenediamine; N,N'-di-sec-butyl-para-phenylenediamine; N-isopropyl - N' - phenyl-para-phenylenediamine; and phenothiazine. Further useful amines include condensation products of aromatic amines with aldehydes and ketones, for example, the reaction products of acetaldehyde, butyraldehyde, and acetone with aniline, toluidines, higher alkylated anilines, naphthylamines, and the like.

Exemplary phenolic compounds are, for instance, the alkylation products of phenols, polyphenols, etc., with styrene, alkenes, e.g., isobutylene, 2,2-dimethylpropene, etc. Illustrative alkylation products are 2,6-di-tert-butyl-para-cresol, 2,5-di-tert-amylhydroquinone, the styrenated phenols, the styrenated cresols, the styrenated phenol-formaldehyde condensation products, and the like.

Another group of phenolic compounds suitable as anti-oxidants are the alkylated diphenolics which are condensation products of disubstituted phenols with various aldehydes. Illustrative of compounds of this type are, among others, 2,2'-methylene bis(4-methyl-6-tert-butylphenol), 2,2'-methylene bis(4-ethyl-6-tert-butylphenol), 4,4'-butylidene bis(6-tert butyl-meta-cresol), and the like.

Still another group of phenolic compounds suitable as anti-oxidants are the phenolic sulfides which can be obtained by the reaction of sulfur chloride with alkylated phenols. Illustrative compounds of this type are, among others, 4,4' - thio-bis(6-tert-butyl-meta-cresol), thio-bis-(di-sec.-amylphenols), and the like.

Illustrative quinolines, useful as anti-oxidants are, among others, 1,2-dihydro-2,2,4-trimethyl-6-phenyl quinolines and polymers thereof, 6-ethoxy-1,2-dihydro-2,2,4-trimethyl quinoline, 6-lauryl-2,2,4-trimethyl dihydroquinoline, and the like.

Illustratitve phosphites which are useful as anti-oxidants are the alkaryl phosphites, for example, the butyl-, the octyl-, and the nonylphenyl phosphites.

In addition to the foregoing anti-oxidants, one can also employ hydroquinone monobenzyl ether.

It is often desirable to add various oils of vegetable or mineral origin, waxes, coal tars, pitches, natural and synthetic resins, and plasticizers to the novel polymeric gum stock. Addition of these materials often results in several benefits in that the above materials may serve as processing aids for the uncured gum stock where they can function, for example, as plasticizers, softeners, lubricants, tackifiers, and dispersing aids. In the novel vulcanizate, they can serve as softeners, plasticizers, freezing point depressants, organic reinforcing agents, and extenders.

In most instances it will be desirable to add one or more reinforcing pigments to the novel polymeric gum stock in order to obtain a novel vulcanizate of improved strength, hardness, and resistance to abrasion or tear. Suitable reinforcing pigments include, among others, various types of carbon blacks, precipitated calcium carbonates, hard clays, hydrated silicon compounds such as calcium silicate and silicon dioxide, zinc oxide, and the like. Inert fillers and diluents may also be employed, if desired. Illustrative materials include, the soft clays, barites, talc, asbestos fiber, cellulosic material, ebonite dust, and the like.

Novel vulcanizates of varying shades of color can be obtained, if desired, by the addition of various mineral pigments and organic dyes to the polymeric gum stock. Although titanium dioxide is probably the most preferred white pigment, white vulcanizates can also be prepared by compounding with zinc oxide, zinc sulfide, lithopone, or other mineral pigments.

In general, any one of several methods of mixing and fluxing can be utilized in the preparation of the vulcanizates. For instance, the polymeric gum stock and any other components of the desired formulation can be intimately dispersed by stirring, for example, in a Banbury mixer, or tumbling and the admixture fluxed on a steam heated roll mill. As is well recognized in the art, the milling operation should not be effected at a temperature which will cause a breakdown or degradation, or conversely, scorch of the polymeric gum stock. A milling temperature below about 100° C., for example, about 70°–80° C., is oftentimes suitable. Other methods of mixing and fluxing, such as a banbury cycle followed by calendering can also be employed.

Curing conditions employed for the compounded formulations will not necessarily be the same for each particular polymeric gum stock. The optimum cure will be that state of cure at which the best balance of desired physical properties is achieved and not necessarily a time at which one or more particular chemical reactions have reached a particular point. Thus, in each instance the optimum physical properties most desired for a particular application must be considered and the curing conditions altered accordingly. As a general rule, the curing or the cross-linking operation of the compounded formulations containing the polymeric gum stocks can be effected at an elevated temperature, e.g., from about 50° C., and lower, to about 200° C., and higher, generally under superatmospheric pressure, e.g., up to 6,000 p.s.i.g., and higher, and for a period of time sufficient to produce vulcanizates having a combination of desirable characteristis, e.g. from about 5 minutes to about one hour, and longer.

The outstanding and highly desirable physical properties of the novel vulcanizates make them particularly useful in various mechanical goods, such as, tires, electrical insulation, cable covering, footwear, gaskets, seals, packing, floor tile, adhesive formulations wherein a flexible bond is desired, and the like.

In the illustrative operative examples below, the polymerization reaction is generally conducted under an inert atmosphere, e.g., nitrogen. The reaction vessel and contents, e.g., cyclic ester(s), cyclic carbonate(s), catalyst, and inert organic vehicle, if any, are maintained, usually under agitation, in a constant temperature bath, e.g., 90° C., or the reaction vessel containing the cyclic ester(s) cyclic carbonate(s), etc., are maintained, usually under agitation, in a constant temperature bath and subsequently the catalyst is added thereto. Since the polymerization reaction, in general, is exothermic a rise in temperature is observed, e.g., 140° to 150° C. In several instances the period recorded is the time observed in which the rotation of the mechanical stirrer ceases due to the high viscosity of the contents in the reaction vessel. In most cases the reaction vessel is left in the constant temperature bath for an additional period of time e.g., about 20 minutes, or longer.

The following terms may oftentimes be employed in the following examples. They are as follows:

(a) *Tensile and elongation.*—Standard test specimens are evaluated on a Scott L-6 Tensile Tester operated at a rate of four feet of extensibility per minute.

(b) *Modulus at 300% elongation, p.s.i.*—Is determined by reading the 300% elongation value on the stress-strain curve as obtained on the above tensile test.

(c) *Durometer hardness "A".*—In accordance with the procedures given in A.S.T.M. Method D–1706–59T.

(d) *Tear resistance.*—In accordance with the procedure given in A.S.T.M. Method D–470.

(e) *Oxidation resistance.*—In accordance with the procedure given in A.S.T.M. Method D–573.

(f) $T_3$, $T_4$, $T_5$ (Instron secant tensile modulus), are temperatures at which modulus is 1000, 10,000, and 100,000 p.s.i. at 1% elongation of sample as measured on an Instron tester equipped with variable temperature cell. $T_3$, $T_4$, $T_5$ gives an indication with respect to performance of a polymer at low temperature.

(g) *Carbon blacks.*—Various blacks are employed such as (1) Philblack-O, a HAF carbon black, manufactured by the Phillips Petroleum Company, (2) Standard Micronex, a MPC carbon black, (3) Micronex W–6, an EPC carbon black, (4) Statex R, a HAF carbon black, and (5) Statex 93, A HMF carbon black; carbon blacks (2) through (5) being manufactured by the Columbian Carbon Company.

(h) *Mixed methyl-epsilon-caprolactone.*—An isomeric mixture of methyl-epsilon-caprolactone which contains, by weight, about 30 percent gamma-methyl-epsilon-caprolactone, about 30 percent epsilon-methyl-caprolactone, and about 40 percent beta-methyl- and delta-methyl-epsilon-caprolactones. This isomeric lactone mixture was prepared by reacting a mixture of 2-methyl-, 3-methyl-, and 4-methylcyclohexanones with peracetic acid.

The examination of the polymeric products were conducted at ambient temperature, e.g., about 23° C., unless otherwise indicated. The proportions of the ingredients are in parts by weight, unless otherwise indicated.

*Example 1*

(A) To a reaction vessel which is equipped with a stirrer and nitrogen inlet tube, there are charged 60 parts of epsilon-caprolactone, 37 parts of 4,4-dimethyl-2,6-dioxacyclohexanone, and 3 parts of 4-ethyl-4-allyloxymethyl-2,6-dioxacyclohexanone. The resulting admixture, maintained under a nitrogen atmosphere, is heated to 40° C. Thereafter, 0.2 part of n-butyllithium, as the catalyst therefor, is added to said admixture. Within a short period the mechanical stirrer ceases due to the high viscosity of the contents in the reaction vessel. The polymerization reaction is essentially complete in about 1 hour. There is obtained a tough, elastomeric solid which upon infrared analysis discloses ethylenic unsaturation.

(B) The above polymeric gum stock is fluxed on a two-roll mill until essentially homogeneous in character. To 100 parts of said gum stock, there are added 50 parts of Standard Micronex, 5 parts of zinc oxide, 1 part of stearic acid, 0.5 part of benzothiazyldisulfide, 0.5 part of tetramethylthiuramdisulfide, while continuously dispersing these added ingredients into the gum stock on a hot rubber mill at 75° C. until homogeneity is achieved. Thereafter the compounded gum stock is cured for a period of 60 minutes at 150° C. There is obtained a tough, rubbery, vulcanizate which exhibits excellent elongation, excellent tear strength, high tensile strength, good resistance toward oxidation, and good low temperature performance.

*Example 2*

To a reaction vessel which is equipped with a stirrer and nitrogen inlet tube, there are charged 98 parts of mixed methyl-epsilon-caprolactone and 2 parts of 4-ethyl-4-allyloxymethyl-2,6-dioxacyclohexanone. The resulting admixture, maintained under a nitrogen atmosphere, is heated to 70° C. Thereafter, 1.5 parts of triisobutylaluminum, as the catalyst therefor, is added to said admixture. Within a short period the mechanical stirrer ceases due to the high viscosity of the contents in the reaction vessel. The polymerization reaction is essentially complete in about 0.5 hour. There is obtained an almost transparent viscous polymer. Infrared analysis of this product discloses ethylenic unsaturation.

*Example 3*

To a reaction vessel which is equipped with a stirrer and nitrogen inlet tube, there are charged 95 parts of epsiloncaprolactone and 5 parts of 4-ethyl-4-allyloxymethyl-2,6-dioxacyclohexanone. The resulting admixture, maintained under a nitrogen atmosphere, is heated to 80° C. Thereafter, 0.5 part of dimethylcadmium, as the catalyst therefor, is added to said admixture. Within a short period the mechanical stirrer ceases due to the high viscosity of the contents in the reaction vessel. The polymerization reaction is essentially complete in about 1 hour. There is obtained a crystalline solid melting at 60–65° C. Infrared analysis of this product discloses ethylenic unsaturation.

Example 4

(A) To a reaction vessel which is equipped with a stirrer and nitrogen inlet tube, there are charged 70 parts of epsilon-caprolactone, 26 parts of 4-nitro-4-methyl-2,6-dioxacyclohexanone, and 4 parts of 4-ethyl-4-allyloxymethyl-2,6-dioxacyclohexanone. The resulting admixture, maintained under a nitrogen atmosphere, is heated to 90° C. Thereafter, 1.5 parts of di-n-butylzinc, as the catalyst therefor, is added to said admixture. Within a short period the mechanical stirrer ceases due to the high viscosity of the contents in the reaction vessel. The polymerization reaction is essentially complete in about 3 hours. There is obtained a tough, elastomeric solid product. Infrared analysis of this product discloses ethylenic unsaturation.

(B) The above polymeric gum stock is fluxed on a two-roll mill until essentially homogeneous in character. To 100 parts of said gum stock, there are added 50 parts of Micronex W-6, 5 parts of zinc oxide, 0.5 part of 2-mercaptobenzothiazole, 1 part of tetramethylthiuramdisulfide, and 2 parts of sulfur, while continuously dispersing these added ingredients into the gum stock on a hot rubber mill at 75° C. until homogeneity is achieved. Thereafter the compounded gum stock is cured for a period of 60 minutes at 160° C. There is obtained a tough, rubbery, vulcanizate which exhibits excellent elongation, excellent tear strength, high tensile strength, good resistance toward oxidation, and good low temperature performance.

Example 5

(A) To a reaction vessel which is equipped with a stirrer and nitrogen inlet tube, there are charged 72 parts of epsiloncaprolactone, 25 parts of 4,4-di(chloromethyl)-2,6-dioxacyclohexanone, and 3 parts of 4-ethyl-4-allyloxymethyl-2,6-dioxacyclohexanone. The resulting admixture, maintained under a nitrogen atmosphere, is heated to 80° C. Thereafter, 1.0 part of diethylzinc, as the catalyst therefor, is added to said admixture. Within a short period the mechanical stirrer ceases due to the high viscosity of the contents in the reaction vessel. The polymerization reaction is essentially complete in about 1 hour. Infrared analysis of the resulting elastomeric product discloses ethylenic unsaturation.

(B) The above polymeric gum stock is fluxed on a two-roll mill until essentially homogeneous in character. To 100 parts of said gum stock, there are added 30 parts of Statex R, 5 parts of zinc oxide, 0.5 part of 2-mercaptobenzothiazole, 1 part of tetramethylthiuramdisulfide, and 2 parts of sulfur, while continuously dispersing these added ingredients into the gum stock on a hot rubber mill at 75° C. until homogeneity is achieved. Thereafter the compounded gum stock is cured for a period of 45 minutes at 160° C. There is obtained a tough, rubbery, vulcanizate which exhibits excellent elongation, excellent tear strength, high tensile strength, good resistance toward oxidation, and good low temperature performance.

Example 6

(A) To a reaction vessel which is equipped with a stirrer and nitrogen inlet tube, there are charged 65 parts of epsiloncaprolactone, 29 parts of 4,4-di(cyanomethyl)-2,6-dioxacyclohexanone, and 6 parts of 4-ethyl-4-allyloxymethyl-2,6-dioxacyclohexanone. The resulting admixture, maintained under a nitrogen atmosphere, is heated to 30° C. Thereafter, 0.5 part of n-butyllithium, as the catalyst therefor, is added to said admixture. Within a short period the mechanical stirrer ceases due to the high viscosity of the contents in the reaction vessel. The polymerization reaction is essentially complete in about 1 hour. The resulting tough, elastomeric solid upon infrared analysis discloses ethylenic unsaturation.

(B) The above polymeric gum stock is fluxed on a two-roll mill until essentially homogeneous in character. To 100 parts of said gum stock, there are added 50 parts of Statex B, 3 parts of zinc oxide, 0.5 part of mercaptobenzothiazole, 1 part of tetraethylthiuramdisulfide, and 2 parts of sulfur while continuously dispersing these added ingredients into the gum stock on a hot rubber mill at 75° C. until homogeneity is achieved. Thereafter the compounded gum stock is cured for a period of 60 minutes at 160° C. There is obtained a tough, rubbery, vulcanizate which exhibits excellent elongation, excellent tear strength, high tensile strength, and good resistance toward oxidation.

Example 7

To a reaction vessel which is equipped with a stirrer and nitrogen inlet tube, there are charged 40 parts of mixed methyl-epsilon-caprolactone, 50 parts of 4,4-dimethyl-2,6-dioxacyclohexanone, and 10 parts of 4-ethyl-4-allyloxymethyl-2,6-dioxacyclohexanone. The resulting admixture, maintained under a nitrogen atmosphere, is heated to 90° C. Thereafter, 1.5 parts of n-butylzinc butoxide, as the catalyst therefor, is added to said admixture. Within a short period the mechanical stirrer ceases due to the high viscosity of the contents in the reaction vessel. The polymeriaztion reaction is essentially complete in about 2 hours. There is obtained a tough, elastomeric solid which upon infrared analysis discloses ethylenic unsaturation.

Example 8

(A) To a reaction vessel which is equipped with a stirrer and nitrogen inlet tube, there are charged 65 parts of epsiloncaprolactone, 30 parts of 4-methyl-4-dimethylamino-2,6-dioxacyclohexanone, and 5 parts of 4-ethyl-4-allyloxymethyl-2,6-dioxacyclohexanone. The resulting admixture, maintained under a nitrogen atmosphere, is heated to 100° C. Thereafter, 1.5 parts of aluminum triisopropoxide, as the catalyst therefor, is added to said admixture. Within a short period the mechanical stirrer ceases due to the high viscosity of the contents in the reaction vessel. The polymerization reaction is essentially complete in about 2 hours. There is obtained a solid polymeric product. Infrared analysis discloses ethylenic unsaturation.

(B) The above polymeric gum stock is fluxed on a two-roll mill until essentially homogeneous in character. To 100 parts of said gum stock, there are added 50 parts of Micronex W-6, 5 parts of zinc oxide, 0.5 part of benzothiazyldisulfide, 1 part of tetramethylthiuramdisulfide, and 2 parts of sulfur while continuously dispersing these added ingredients into the gum stock on a hot rubber mill at 75° C. until homogeneity is achieved. Thereafter the compounded gum stock is cured for a period of 60 minutes at 150° C. There is obtained a vulcanizate which exhibits good elongation, good tear strength, and fair tensile strength.

Example 9

(A) To a reaction vessel which is equipped with a stirrer and nitrogen inlet tube, there are charged 50 parts of epsiloncaprolactone, 49 parts of delta-valerolactone, and 1 part of 4-ethyl-4-allyloxymethyl-2,6-dioxacyclohexanone. The resulting admixture, maintained under a nitrogen atmosphere, is heated to 70° C. Thereafter, 1 part of equal molar amounts of aluminum triisopropoxide-zinc chloride, as the co-catalyst system therefor, is added to said admixture. Within a short period the mechanical stirrer ceases due to the high viscosity of the contents in the reaction vessel. The polymerization reaction is essentially complete in about 2 hours. There is obtained an elastomeric solid which upon infrared analysis discloses ethylenic unsaturation.

(B) The above polymeric gum stock is fluxed on a two-roll mill until essentially homogeneous in character. To 100 parts of said gum stock, there are added 50 parts of Statex 93, 25 parts of zinc oxide, 1.5 parts of sulfur, and 3 parts of selenium diethyldithiocarbamate while continuously dispersing these added ingredients into the gum stock on a hot rubber mill at 75° C. until homogeneity is achieved. Thereafter the compounded gum stock is cured for a period of 60 minutes at 150° C. There is obtained a tough, rubbery, vulcanizate which exhibits excellent elongation, excellent tear strength, high tensile strength, good resistance toward oxidation, and good low temperature performance.

*Example 10*

(A) To a reaction vessel which is equipped with a stirrer and nitrogen inlet tube, there are charged 65 parts of epsiloncaprolactone, 32 parts of alpha, alpha-dimethyl-beta-propiolactone, and 3 parts of 4-ethyl-4-allyloxymethyl-2,6-dioxacyclohexanone. The resulting admixture, maintained under a nitrogen atmosphere, is heated to 80° C. Thereafter, 1.0 part of the reaction product of equal molar amounts of triisobutylaluminum-water, as the catalyst system therefor, is added to said admixture. Within a short period the mechanical stirrer ceases due to the high viscosity of the contents in the reaction vessel. The polymerization reaction is essentially complete in about 1 hour. There is obtained a tough, elastomeric solid which upon infrared analysis discloses ethylenic unsaturation.

(B) The above polymeric gum stock is fluxed on a two-roll mill until essentially homogeneous in character. To 100 parts of said gum stock, there are added 50 parts of Standard Micronex, 5 parts of zinc oxide, 1 part of stearic acid, 0.5 part of benzothiazyldisulfide, 1 part of tetramethylthiuramdisulfide, and 2 parts of sulfur while continuously dispersing these added ingredients into the gum stock on a hot rubber mill at 75° C. until homogeneity is achieved. Thereafter the compounded gum stock is cured for a period of 60 minutes at 160° C. There is obtained a tough, rubbery, vulcanizate which exhibits excellent elongation, excellent tear strength, high tensile strength, good resistance toward oxidation, and good low temperature performance.

*Example 11*

To a reaction vessel which is equipped with a stirrer and nitrogen inlet tube, there are charged 97 parts of alpha, alpha-dimethyl-beta-propiolactone and 3 parts of 4-ethyl-4-allyloxymethly - 2,6 - dioxacyclohexanone. The resulting admixture, maintained under a nitrogen atmosphere, is heated to 100° C. Thereafter, 0.3 part of di-methylcadmium, as the catalyst therefor, is added to said admixture. Within a short period the mechanical stirrer ceases due to the high viscosity of the contents in the reaction vessel. The polymerization reaction is essentially complete in about 1 hour. There is obtained a crystalline polymeric product which upon infrared analysis discloses ethylenic unsaturation.

*Example 12*

To a reaction vessel which is equipped with a stirrer and nitrogen inlet tube, there are charged 75 parts of epsiloncaprolactone, 24 parts of 4,4-dimethyl-2,6-dioxa-cyclohexanone, and 1 part of 4-ethyl-4-vinyloxymethyl-2,6-dioxacyclohexanone. The resulting admixture, maintained under a nitrogen atmosphere, is heated to 80° C. Thereafter, 1 part of the reaction product of 2 mols of di-n-butylzinc with one mol of water, as the catalyst system therefor, is added to said admixture. Within a short period the mechanical stirrer ceases due to the high viscosity of the contents in the reaction vessel. The polymerization reaction is essentially complete in about 1 hour. There is obtained a tough, elastomeric solid which upon infrared analysis discloses ethylenic unsaturation.

*Example 13*

To a reaction vessel which is equipped with a stirrer and nitrogen inlet tube, there are charged 93 parts of epsiloncaprolactone and 7 parts of 4,4-diallyloxymethyl-2,6-dioxacyclohexanone. The resulting admixture, maintained under a nitrogen atmosphere, is heated to 40° C. Thereafter, 0.4 parts of n-butyllithium, as the catalyst therefor, is added to said admixture. Within a short period the mechanical stirrer ceases due to the high viscosity of the contents of the reaction vessel. The polymerization reaction is essentially complete in about 0.5 hour. There is obtained a crystalline polymeric product which upon infrared analysis discloses ethylenic unsaturation.

*Example 14*

To a reaction vessel which is equipped with a stirrer and nitrogen inlet tube, there are charged 40 parts of epsiloncaprolactone, 55 parts of 4-nitro-4-ethoxymethyl-2,6-dioxacyclohexanone, and 5 parts of 4-ethyl-4-propenoyloxymethyl-2,6-dioxacyclohexanone. The resulting admixture, maintained under a nitrogen atmosphere, is heated to 80° C. Thereafter, 0.7 part of di-n-butylzinc, as the catalyst therefor, is added to said admixture. Within a short period the mechanical stirrer ceases due to the high viscosity of the contents in the reaction vessel. The polymerization reaction is essentially complete in about 2 hours. There is obtained an elastomeric solid which upon infrared analysis discloses ethylenic unsaturation.

*Example 15*

(A) To a reaction vessel which is equipped with a stirrer and nitrogen inlet tube, there are charged 50 parts of epsiloncaprolactone, 48.5 parts of 4,4-diethoxymethyl-2,6-dioxacyclohexanone, and 1,5 parts of 4,4-dipropenoyloxymethyl-2,6-dioxacyclohexanone. The resulting admixture, maintained under a nitrogen atmosphere, is heated to 80° C. Thereafter, 0.7 part of dimethylcadmium, as the catalyst therefor, is added to said admixture. Within a short period the mechanical stirrer ceases due to the high viscosity of the contents in the reaction vessel. The polymerization reaction is essentially complete in about 0.5 hour. There is obtained a tough, elastmeric solid which upon infrared analysis discloses ethylenic unsaturation.

(B) The above polymeric gum stock is fluxed on a two-roll mill until essentially homogeneous in character. To 100 parts of said gum stock, there are added 50 parts of Standard Micronex, 5 parts of zinc oxide, 0.5 part of mercaptobenzothiazole, 1 part of tetramethylthiuramdisulfide, and 2 parts of sulfur while continuously dispersing these added ingredients into the gum stock on a hot rubber mill at 75° C. until homogeneity is achieved. Thereafter the compounded gum stock is cured for a period of 60 minutes at 150° C. There is obtained a tough, rubbery, vulcanizate which exhibits excellent elongation, excellent tear strength, high tensile strength, good resistance toward oxidation, and good low temperature performance.

*Example 16*

To a reaction vessel which is equipped with a stirrer and nitrogen inlet tube, there are charged 90 parts of epsiloncaprolactone, 8 parts of zeta-entholacetone, and 2 parts of 4-ethyl-4-allyloxymethyl - 2,6 - dioxacyclohexanone. The resulting admixture, maintained under a nitrogen atmosphere, is heated to 80° C. Thereafter, 1.5 parts of ethylaluminum dichloride, as the catalyst therefor, is added to said admixture. Within a short period the mechanical stirrer ceases due to the high viscosity of the contents in the reaction vessel. The polymerization reaction is essentially complete in about 3 hours. There is obtained a crystalline polymeric product which upon infrared analysis discloses ethylenic unsaturation.

*Example 17*

To a reaction vessel which is equipped with a stirrer and nitrogen inlet tube, there are charged 60 parts of epsiloncaprolactone, 30 parts of 4,4-dimethyl-2,6-dioxa-cyclohexanone, and 10 parts of 4-nitro-4-allyloxymethyl- 2,6-dioxacyclohexanone. The resulting admixture, maintained under a nitrogen atmosphere, is heated to 100° C. Thereafter, 1,5 parts of ethylmagnesium bromide, as the catalyst therefor, is added to said admixture. Within a short period the mechanical stirrer ceases due to the high viscosity of the contents in the reaction vessel. The polymerization reaction is essentially complete in about 4 hours. There is obtained a tough, elastomeric solid which upon infrared analysis discloses ethylenic unsaturation.

*Example 18*

To a reaction vessel which is equipped with a stirrer and nitrogen inlet tube, there are charged 60 parts of epsiloncaprolactone, 27 parts of 4,4-di(chloromethyl)-2,6-dioxacyclohexanone, and 3 parts of 4-nitro-4-propenoyloxymethyl-2,6-dioxacyclohexanone. The resulting admixture, maintained under a nitrogen atmosphere, is heated to 90° C. Thereafter, 1 part of dibutylaluminum chloride, as the catalyst therefor, is added to said admixture. Within a short period the mechanical stirrer ceases due to the high viscosity of the contents in the reaction vessel. The polymerization reaction is essentially complete in about 4 hours. There is obtained a tough, elastomeric solid which upon infrared analysis discloses ethylenic unsaturation.

*Example 19*

To a reaction vessel which is equipped with a stirrer and nitrogen inlet tube, there are charged 95 parts of epsiloncaprolactone and 5 parts of 4-diethylamino-4-(2-butenoyloxymethyl)-2,6-dioxacyclohexanone. The resulting admixture, maintained under a nitrogen atmosphere, is heated to 90° C. Thereafter, 2 parts of di-2-ethylhexyl-zinc, as the catalyst therefor, is added to said admixture. Within a short period the mechanical stirrer ceases due to the high viscosity of the contents in the reaction vessel. The polymerization reaction is essentially complete in about 1 hour. There is obtained a polymeric solid which upon infrared analysis discloses ethylenic unsaturation.

*Example 20*

To a reaction vessel which is equipped with a stirrer and nitrogen inlet tube, there are charged 70 parts of epsiloncaprolactone, 28 parts of 4-nitro-4-ethoxymethyl-2,6-dioxacyclohexanone, and 2 parts of 4-methyl-4-allyl-2,6-dioxacyclohexanone. The resulting admixture, maintained under a nitrogen atmosphere, is heated to 100° C. Thereafter, 0.5 part of dimethylberyllium, as the catalyst therefor, is added to said admixture. Within a short period the mechanical stirrer ceases due to the high viscosity of the contents in the reaction vessel. The polymerization reaction is essentially complete in about 2 hours. There is obtained a solid product which upon infrared analysis discloses ethylenic unsaturation.

*Example 21*

To a reaction vessel which is equipped with a stirrer and nitrogen inlet tube, there are charged 95 parts of 14-hydroxy-tetradecanoic acid lactone and 5 parts of 4-ethyl-4-allyloxymethyl-2,6-dioxacyclohexanone. The resulting admixture, maintained under a nitrogen atmosphere, is heated to 30° C. Thereafter, 0.5 part of n-butyllithium, as the catalyst therefor, is added to said admixture. Within a short period the mechanical stirrer ceases due to the high viscosity of the contents in the reaction vessel. The polymerization reaction is essentially complete in about 1 hour. There is obtained a crystalline polymeric product solid which upon infrared analysis discloses ethylenic unsaturation.

*Example 22*

To a reaction vessel which is equipped with a stirrer and nitrogen inlet tube, there are charged 85 parts of 2-keto-1,4-dioxane and 15 parts of 4-ethyl-4-allyloxymethyl-2,6-dioxacyclohexanone. The resulting admixture, maintained under a nitrogen atmosphere, is heated to 80° C. Thereafter, 0.5 parts of dimethylcadmium, as the catalyst therefor, is added to said admixture. Within a short period the mechanical stirrer ceases due to the high viscosity of the contents in the reaction vessel. The polymerization reaction is essentially complete in about 1 hour. There is obtained a solid polymeric product which upon infrared analysis discloses ethylenic unsaturation.

*Example 23*

To a reaction vessel which is equipped with a stirrer and nitrogen inlet tube, there are charged 80 parts of epsilon-caprolactane, 15 parts of 2-keto-1,4-dioxane and 5 parts of 4-ethyl-4-vinyloxymethyl-2,6-dioxacyclohexanone. The resulting admixture, maintained under a nitrogen atmosphere, is heated to 70° C. Thereafter, 0.3 part of dimethylcadmium, as the catalyst therefor, is added to said admixture. Wtihin a short period the mechanical stirrer ceases due to the high viscosity of the contents in the reaction vessel. The polymerization reaction is essentially complete in about 1 hour. There is obtained a crystalline polymer which upon infrared analysis discloses ethylenic unsaturation.

*Example 24*

To a reaction vessel which is equipped with a stirrer and nitrogen inlet tube, there are charged 10 parts of 12-oxa-15-hydroxypentadecanoic acid lactone, 87 parts of 4,4-dimethyl-2,6-dioxacyclohexanone, and 3 parts of 4-nitro-4-allyloxymethyl-2,6-dioxacyclohexanone. The resulting admixture, maintained under a nitrogen atmosphere, is heated to 80° C. Thereafter, 1 part of diethylmagnesium, as the catalyst therefor, is added to said admixture. Within a short period the mechanical stirrer ceases due to the high viscosity of the contents in the reaction vessel. The polymerization reaction is essentially complete in about 2 hours. There is obtained a polymeric product which upon infrared analysis discloses ethylenic unsaturation.

*Example 25*

To a reaction vessel which is equipped with a stirrer and nitrogen inlet tube, there are charged 50 parts of epsiloncaprolactone, 45 parts of 2,3,4,5-tetrahydrobenz-oxepin-2-one, and 5 parts of 4-ethyl-4-(3-butenoyloxymethyl)-2,6-dioxacyclohexanone. The resulting admixture, maintained under a nitrogen atmosphere, is heated to 100° C. Thereafter, 1.5 parts of triethylaluminum, as the catalyst therefor, is added to said admixture. Within a short period the mechanical stirrer ceases due to the high viscosity of the contents in the reaction vessel. The polymerization reaction is essentially complete in about 3 hours. There is obtained a solid polymer which upon infrared analysis discloses ethylenic unsaturation.

*Example 26*

To a reaction vessel which is equipped with a stirrer and nitrogen inlet tube, there are charged 15 parts of epsiloncaprolactone, 80 parts of gamma-(1-isopropyl-4-methylcyclohexyl)-epsilon-caprolactone, and 5 parts of 4,4-diallyloxymethyl-2,6-dioxacyclohexanone. The resulting admixture, maintained under a nitrogen atmosphere, is heated to 90° C. Thereafter, 0.5 part of dimethylcadmium, as the catalyst therefor, is added to said admixture. Within a short period the mechanical stirrer ceases due to the high viscosity of the contents in the reaction vessel. The polymerization reaction is essentially complete in about 3 hours. There is obtained a viscous liquid product.

*Example 27*

To a reaction vessel which is equipped with a stirrer and nitrogen inlet tube, there are charged 84 parts of epsilon-caprolactone, 15 parts of gamma, delta-dibromo-gamma, delta-dimethyl-delta-valerolactone, and 1 part of 4,4 - di(2 - methylpropenoyloxymethyl) - 2,6 - dioxacyclohexanone. The resulting admixture, maintained under a nitrogen atmosphere, is heated to 40° C. Thereafter, 0.5 part of n-butyllithium, as the catalyst therefor, is added to said admixture. Within a short period the mechanical stirrer ceases due to the high viscosity of the contents in the reaction vessel. The polymerization reaction is essentially complete in about 2 hours. There is obtained a solid polymer which upon infrared analysis discloses ethylenic unsaturation.

*Example 28*

To a reaction vessel which is equipped with a stirrer and nitrogen inlet tube, there are charged 25 parts of epsilon-caprolactone, 73 parts of 3-oxo-8-thia-2,4-dioxaspiro[5.3]nonane-8-dioxide, and 2 parts of 9-vinyl-3-oxo-2,4,8,10-tetraoxaspiro[5.5]undecane. The resulting admixture, maintained under a nitrogen atmosphere, is heated to 100° C. Thereafter, 1.5 parts of di-n-butylzinc, as the catalyst therefor, is added to said admixture. Within a short period the mechanical stirrer ceases due to the high viscosity of the contents in the reaction vessel. The polymerization reaction is essentially complete in about 3 hours. There is obtained a solid polymer which upon infrared analysis discloses ethylenic unsaturation.

*Example 29*

To a reaction vessel which is equipped with a stirrer and nitrogen inlet tube, there are charged 65 parts of epsilon-caprolactone, 30 parts of 4,4-dimethyl-2,6-dioxacyclohexanone, and 5 parts of 3-oxo-2,4-dioxaspiro[5.5]-undec-9-ene. The resulting admixture, maintained under a nitrogen atmosphere, is heated to 30° C. Thereafter, 0.7 part of n-butyllithium, as the catalyst therefor, is added to said admixture. Within a short period the mechanical stirrer ceases due to the high viscosity of the contents in the reaction vessel. The polymerization reaction is essentially complete in about 1 hour. There is obtained a tough, elastomeric solid which upon infrared analysis discloses ethylenic unsaturation.

*Example 30*

To a reaction vessel which is equipped with a stirrer and nitrogen inlet tube, there are charged 80 parts of epsiloncaprolactone, 15 parts of 3-oxo-2,4,7-trioxaspiro-[5.4]decane, and 5 parts of 4-ethyl-4-allyloxymethyl-2,6-dioxacyclohexanone. The resulting admixture, maintained under a nitrogen atmosphere, is heated to 90° C. Thereafter, 1 part of diethylzinc, as the catalyst therefor, is added to said admixture. Within a short period the mechanical stirrer ceases due to the high viscosity of the contents in the reaction vessel. The polymerization reaction is essentially complete in about 1 hour. There is obtained a solid polymer which upon infrared analysis discloses ethylenic unsaturation.

*Example 31*

(A) To a reaction vessel which is equipped with a stirrer and nitrogen inlet tube, there are charged 63 parts of epsilon-caprolactone, 30 parts of mixed methyl-epsilon-caprolactones, and 5 parts of 4-ethyl-4-allyloxymethyl-2,6-dioxacyclohexanone. The resulting admixture, maintained under a nitrogen atmosphere, is heated to 90° C. Thereafter, 0.5 part of di-n-butylzinc, as the catalyst therefor, is added to said admixture. Within a short period the mechanical stirrer ceases due to the high viscosity of the contents in the reaction vessel. The polymerization reaction is essentially complete in about 10 minutes. There is obtained a tough, elastomeric solid which has a reduced viscosity value of 1.55. Infrared analysis of this product discloses ethylenic unsaturation.

(B) The above polymeric gum stock is fluxed on a two-roll mill until essentially homogeneous in character. To 100 parts of said gum stock, there are added 30 parts of Philblack O, and 0.25 part of dicumyl peroxide while continuously dispersing these added ingredients into the gum stock on a cold rubber mill at 30° C. until homogeneity is achieved. Thereafter the compounded gum stock is cured for a period of 45 minutes at 150° C. The resulting vulcanizate is evaluated for various physical characteristics, to wit:

Tensile strength, p.s.i. _____ 2000
Elongation at break, percent _____ 585
300% modulus, p.s.i. _____ 545
Hardness, Shore A _____ 39
$T_3$, ° C. _____ +10
$T_4$, ° C. _____ −44
$T_5$, ° C. _____ −63

*Example 32*

(A) To a reaction vessel which is equipped with a stirrer and nitrogen inlet tube, there are charged 600 parts of toluene, 59.6 parts of epsilon-caprolactone, 39.8 parts of mixed methyl-epsilon-caprolactones, and 0.6 part of 4 - ethyl - 4 - allyloxymethyl - 2,6 - dioxacyclohexanone. The resulting admixture, maintained under a nitrogen atmosphere, is heated to 60° C. Thereafter, 0.6 part of dimethylcadmium, as the catalyst therefor, is added to said admixture. The solution polymerization is conducted at 60–70° C. for 2.5 hours. The polymer is precipitated by pouring into a heptane Dry Ice slurry and the resulting polymer is dried in vacuo. The tough, elastomeric product is obtained in essentially quantitative yield and has a reduced viscosity of 1.83. Infrared analysis of this product discloses ethylenic unsaturation.

(B) The above polymeric gum stock is fluxed on a two-roll mill until essentially homogeneous in character. To 100 parts of said gum stock, there are added 30 parts of Philblack-O, and 1.0 part of dicumyl peroxide while continuously dispersing these added ingredients into the gum stock on a cold rubber mill at 30° C. until homogeneity is achieved. Thereafter the compounded gum stock is cured for a period of 45 minutes at 150° C. The resulting vulcanizate is evaluated for various physical characteristics, to wit:

Tensile strength, p.s.i. _____ 2390
Elongation at break, percent _____ 560
300% modulus, p.s.i. _____ 1090
Hardness, Shore A _____ 42
$T_3$, ° C. _____ +2
$T_4$, ° C. _____ −59
$T_5$, ° C. _____ −64

*Example 33*

(A) To a reaction vessel which is equipped with a stirrer and nitrogen inlet tube, there are charged 600 parts of toluene, 66 parts of epsilon-caprolactone, 28.6 parts of mixed methyl epsilon-caprolactones, and 5.4 parts of 4-ethyl-4-allyloxy-methyl-2,6-dioxacyclohexanone. The resulting admixture, maintained under a nitrogen atmosphere, is heated to 60° C. Thereafter, 0.6 part of dimethylcadmium, as the catalyst therefor, is added to said admixture. The solution polymerization and the recovery polymer are conducted in identical manner as described in the preceding example. The polymerization reaction is essentially complete in about 2.5 hours at 60–70° C. There is obtained a tough, elastomeric solid which has a reduced viscosity value of 3.03. Infrared analysis of this product discloses ethylenic unsaturation.

(B) The above polymeric gum stock is fluxed on a two-roll mill until essentially homogeneous in character. To 100 parts of said gum stock, there are added 30 parts of Philblack-O, 1.54 parts of sulfur, 4.6 parts of benzothiazyldisulfide, 0.78 part of 2-mercaptobenzothiazole, and 0.31 part of zinc p-methoxy-dithiocarbanilate while continuously dispersing these added ingredients into the gum stock on a hot rubber mill at 75° C. until homogeneity is achieved. Thereafter the compounded gum stock is cured for a period of 90 minutes at 140° C. The resulting vulcanizate is evaluated for various physical characteristics, to wit:

Tensile strength, p.s.i. _____ 2900
Elongation at break, percent _____ 710
300% modulus, p.s.i. _____ 795
Hardness, Shore A _____ 50

What is claimed is:

1. The substantially linear polyethylenically unsaturated polyester polycarbonate polymers containing at least about 50 mol percent of the recurring Unit I (I) 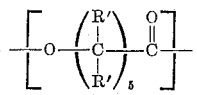

wherein each R' is of the group consisting of hydrogen and lower alkyl, with the proviso that no more than 3 R' variables are substituents other than hydrogen; and up to about 50 mol percent of the recurring Unit II (II) 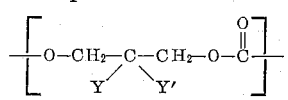

wherein Y is of the group consisting of alkyl, alkenyl, alkenyloxymethyl, alkenoyloxymethyl, and nitro; wherein Y' is of the group consisting of alkyl, alkenyl, alkenyloxymethyl, and alkenoyloxymethyl; and wherein Y and Y' together with the gem carbon of Unit II form a divalent ethylenically unsaturated nucleus which contains six atoms in a ring and which is of the group consisting of carbocyclic and heterocyclic nuclei, said heterocyclic nucleus being composed of carbon and oxygen atoms; with the proviso that the choice of Y and Y' is such that Unit II contains at least one carbon to carbon double bond; said polyester polycarbonate polymers having a reduced viscosity value of upwards of about 0.1 as measured at a concentration of 0.4 gram of said polymer in 100 milliliters of chloroform at 30° C.; and said polyester polycarbonate polymers being characterized in that the recurring units are essentially interconnected through the oxy group of one unit with a carbonyl of a second unit.

2. The substantially linear polyethylenically unsaturated polyester polycarbonate polymers of claim 1 wherein said polymers have a reduced viscosity value of upwards of about 0.8.

3. The substantially linear polyethylenically unsaturated polyester polycarbonate polymers of claim 2 wherein said polymers contain at least about 80 mol percent of Unit I and upwards to about 20 mol percent of Unit II.

4. The substantially linear polyethylenically unsaturated polyester polycarbonate polymers containing up to about 99.75 mol percent of the recurring unit:

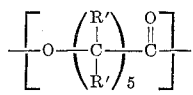

wherein each R' is of the group consisting of hydrogen and lower alkyl, with the proviso that no more than 3 R' variables are substituents other than hydrogen; and at least about 0.25 mol percent of the recurring unit:

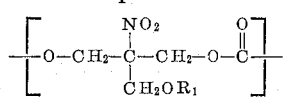

wherein R is lower alkyl and wherein $R_1$ is lower alkenyl; said polyester polycarbonate polymers having a reduced viscosity value of upwards of about 0.5 as measured at a concentration of 0.4 gram of said polymer in 100 milliliters of chloroform at 30° C.; and said polyester polycarbonate polymers being characterized in that the recurring units are essentially interconnected through the oxy group of one unit with a carbonyl group of a second unit.

5. The substantially linear polyethylenically unsaturated polyester polycarbonate polymers containing up to about 99.75 mol percent of the recurring unit:

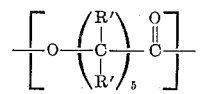

wherein each R' is of the group consisting of hydrogen and lower alkyl, with the proviso that no more than 3 R' variables are substituents other than hydrogen; and at least about 0.25 mol percent of the recurring unit:

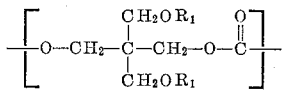

wherein R is lower alkenyl; said polyester polycarbonate polymers having a reduced viscosity value of upwards of about 0.5 as measured at a concentration of 0.4 gram of said polymer in 100 milliliters of chloroform at 30° C.; and said polyester polycarbonate polymers being characterized in that the recurring units are essentially interconnected through the oxy group of one unit with a carbonyl group of a second unit.

6. The substantially linear polyethylenically unsaturated polyester polycarbonate polymers containing up to about 99.75 mol percent of the recurring unit:

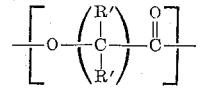

wherein each R' is of the group consisting of hydrogen and lower alkyl, with the proviso that no more than 3 R' variables are substituents other than hydrogen; and at least about 0.25 mol percent of the recurring unit:

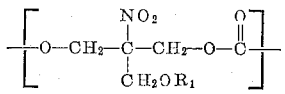

wherein $R_1$ is lower alkenyl; said polyester polycarbonate polymers having a reduced viscosity value of upwards of about 0.5 as measured at a concentration of 0.4 gram of said polymer in 100 milliliters of chloroform at 30° C.; and said polyester polycarbonate polymers being characterized in that the recurring units are essentially interconnected through the oxy group of one unit with a carbonyl group of a second unit.

7. The substantially linear polyethylenically unsaturated polyester polycarbonate polymers containing (a) from about 50 to about 99.75 mol percent of the recurring unit:

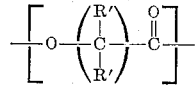

wherein each R' is of the group consisting of hydrogen and methyl, with the proviso that no more than 3 R' variables are methyl groups; and (b) from about 0.5 to about 15 mol percent of the recurring unit:

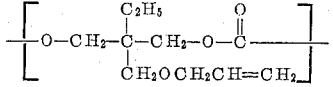

said polyester polycarbonate polymers having a reduced viscosity value of upwards of about 0.5 as measured at a concentration of 0.4 gram of said polymer in 100 milliliters of chloroform at 30° C.; and said polymer polycarbonate polymers being characterized in that recurring units are essentially interconnected through the oxy group of one unit with a carbonyl group of a second unit.

8. The product obtained by cross-linking, through the ethylenically unsaturated groups, the polymers of claim 1.

9. The product obtained by cross-linking, through the ethylenically unsaturated groups, the polymers of claim 2.

10. The product obtained by cross-linking, through the ethylenically unsaturated groups, the polymers of claim 3.

11. An elastomeric product obtained by cross-linking, through the pendant lower alkenyloxymethyl groups, the polymers of claim 4.

12. An elastomeric product obtained by cross-linking, through the pendant lower alkenyloxymethyl groups, the polymers of claim 5.

13. An elastomeric product obtained by cross-linking, through the pendant lower alkenyloxymethyl groups, the polymers of claim 6.

14. An elastomeric product obtained by cross-linking, through the pendant allyloxymethyl groups, the polymers of claim 7.

References Cited by the Examiner

UNITED STATES PATENTS

| | | | |
|---|---|---|---|
| 2,384,126 | 9/1945 | Muskat et al. | 260—77.5 |
| 2,517,965 | 8/1950 | Bohl | 260—77.5 |
| 3,030,331 | 4/1962 | Goldberg | 260—77.5 |
| 3,046,255 | 7/1962 | Strain et al. | 260—77.5 |
| 3,169,121 | 2/1965 | Goldberg | 260—47 |

SAMUEL H. BLECH, *Primary Examiner.*

UNITED STATES PATENT OFFICE
CERTIFICATE OF CORRECTION

Patent No. 3,301,825                                January 31, 1967

Fritz Hostettler et al.

It is hereby certified that error appears in the above numbered patent requiring correction and that the said Letters Patent should read as corrected below.

Column 39, lines 65 to 68, the formula should appear as shown below instead of as in the patent:

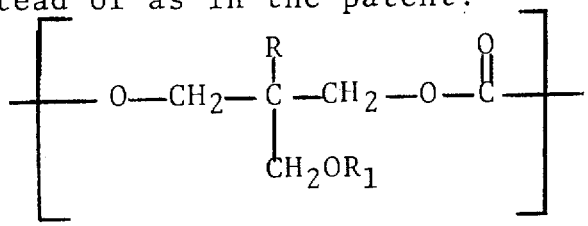

column 40, lines 30 to 33 and 54 to 57, the formulas, each occurrence, should appear as shown below instead of as in the patent:

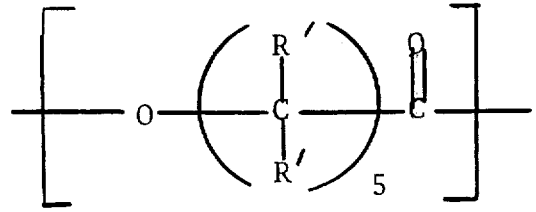

Signed and sealed this 17th day of October 1967.

(SEAL)
Attest:

EDWARD M. FLETCHER, JR.                      EDWARD J. BRENNER
Attesting Officer                              Commissioner of Patents